US012569950B2

(12) United States Patent　　　(10) Patent No.:　US 12,569,950 B2
Asada　　　　　　　　　　　　　(45) Date of Patent:　　Mar. 10, 2026

(54) INFORMATION PROCESSING SYSTEM AND MACHINE TOOL

(71) Applicant: DMG MORI CO., LTD., Nara (JP)

(72) Inventor: Tetsushi Asada, Nara (JP)

(73) Assignee: DMG MORI CO., LTD., Nara (JP)

( * ) Notice: Subject to any disclaimer, the term of this patent is extended or adjusted under 35 U.S.C. 154(b) by 552 days.

(21) Appl. No.: 18/081,823

(22) Filed: Dec. 15, 2022

(65) Prior Publication Data

US 2023/0118193 A1　　Apr. 20, 2023

Related U.S. Application Data

(63) Continuation of application No. PCT/JP2021/017388, filed on May 6, 2021.

(30) Foreign Application Priority Data

Jun. 29, 2020　(JP) ................................ 2020-111273

(51) Int. Cl.
*B23Q 3/157*　　(2006.01)
*B23Q 3/155*　　(2006.01)
*G05B 19/4061*　(2006.01)
*B23B 3/16*　　(2006.01)
(52) U.S. Cl.
CPC ..... *B23Q 3/15713* (2013.01); *B23Q 3/15503* (2016.11); *B23Q 3/15534* (2016.11); *G05B 19/4061* (2013.01); *B23B 3/16* (2013.01); *B23Q 2003/15532* (2016.11)

(58) Field of Classification Search
CPC ............ B23Q 3/15713; B23Q 3/15503; B23Q 3/15534; B23Q 2003/15532; G05B 19/4061; B23B 3/16
See application file for complete search history.

(56) References Cited

U.S. PATENT DOCUMENTS

| | | | | | |
|---|---|---|---|---|---|
| 4,994,977 | A | * | 2/1991 | Tsujido .............. | G05B 19/4061 700/184 |
| 5,734,573 | A | * | 3/1998 | Niwa ................. | G05B 19/4069 700/194 |
| 9,651,938 | B2 | * | 5/2017 | Mitsuhashi ........ | G05B 19/4061 |
| 2005/0283270 | A1 | * | 12/2005 | Nakamura ......... | G05B 19/4069 700/178 |

(Continued)

FOREIGN PATENT DOCUMENTS

JP　　S62218037 A　　9/1987
JP　　H071272 A　　1/1995

(Continued)

*Primary Examiner* — Ryan J. Walters
(74) *Attorney, Agent, or Firm* — IP Business Solutions, LLC

(57) ABSTRACT

An information processing system includes a request accepting unit for accepting a request for a selected pot to store a selected tool in a pot of a machine tool magazine; a storing unit for storing a setting value in each of a first cell and a second cell of the selected pot; a selecting unit for selecting the first cell or the second cell for the selected pot; a determining unit for determining a condition to store the selected tool in the selected pot on the basis of a size of each tool, a selected cell, and a storage condition of each of the pots; and an informing unit for informing when the condition of storage is not met.

4 Claims, 34 Drawing Sheets

(56) References Cited

U.S. PATENT DOCUMENTS

2009/0062955 A1 *   3/2009  Ide ..................... G05B 19/4061
                                                        700/178
2013/0331245 A1 *  12/2013  Koike ............... B23Q 3/15706
                                                        483/54

FOREIGN PATENT DOCUMENTS

JP          H10296568  A      11/1998
JP          H1142533   A       2/1999

* cited by examiner

| POT NUMBER | UPPER POT NUMBER | LOWER POT NUMBER | OPERATION RULE | | MACHINERY LIMITATION | |
|---|---|---|---|---|---|---|
| | | | UPPER LIMIT OF MAXIMUM DIAMETER | UPPER LIMIT OF LENGTH | UPPER LIMIT OF MAXIMUM DIAMETER | UPPER LIMIT OF LENGTH |
| P001 | P002 | NONE | 70mm | 300mm | 120mm | 300mm |
| P002 | P003 | P001 | 70mm | 300mm | 120mm | 300mm |
| P003 | P004 | P002 | 70mm | 300mm | 120mm | 300mm |
| ... | ... | ... | ... | ... | ... | ... |
| P043 | P044 | NONE | 70mm | 300mm | 120mm | 300mm |
| P044 | P045 | P043 | 120mm | 300mm | 120mm | 300mm |
| P045 | P046 | P044 | 70mm | 300mm | 120mm | 300mm |
| P046 | P047 | P045 | 120mm | 300mm | 120mm | 300mm |
| ... | ... | ... | ... | ... | ... | ... |

FIG. 5

| TOOL NUMBER | DIMENSION | |
|---|---|---|
| | MAXIMUM DIAMETER | LENGTH |
| T001 | 60mm | 200mm |
| T002 | 110mm | 200mm |
| T003 | 66mm | 240mm |
| ⋮ | ⋮ | ⋮ |

FIG. 6

| POT NUMBER | TOOL NUMBER | USE PROHIBITION FLAG |
|---|---|---|
| P001 | T010 | OFF |
| P002 | NONE | OFF |
| P003 | T035 | OFF |
| P004 | NONE | ON |
| ⋮ | ⋮ | ⋮ |

| POT NUMBER | UPPER POT NUMBER | LOWER POT NUMBER | MAXIMUM TOOL LENGTH | PRIORITY | L0 VALUE | L1 VALUE | L2 VALUE | L3 VALUE | L4 VALUE |
|---|---|---|---|---|---|---|---|---|---|
| 1 | -1 | 2 | 800mm | 4 | 55mm | 0mm | 0mm | 0mm | 0mm |
| 2 | 1 | 3 | 800mm | 4 | 55mm | 100mm | 0mm | 0mm | 0mm |
| 3 | 2 | 4 | 800mm | 4 | 55mm | 0mm | 0mm | 0mm | 0mm |
| 4 | 3 | 5 | 800mm | 4 | 55mm | 100mm | 0mm | 0mm | 0mm |
| 5 | 4 | 6 | 800mm | 4 | 55mm | 0mm | 0mm | 0mm | 0mm |
| 6 | 5 | 7 | 800mm | 4 | 55mm | 0mm | 0mm | 0mm | 0mm |
| 7 | 6 | 8 | 800mm | 4 | 55mm | 100mm | 0mm | 0mm | 0mm |
| 8 | 7 | 9 | 800mm | 4 | 55mm | 0mm | 0mm | 0mm | 0mm |
| 9 | 8 | 10 | 800mm | 4 | 55mm | 100mm | 0mm | 0mm | 0mm |
| 10 | 9 | 11 | 800mm | 4 | 55mm | 0mm | 0mm | 0mm | 0mm |
| 11 | 10 | 12 | 800mm | 4 | 55mm | 0mm | 0mm | 0mm | 0mm |
| 12 | 11 | 13 | 800mm | 4 | 55mm | 100mm | 0mm | 0mm | 0mm |
| 13 | 12 | 14 | 800mm | 4 | 55mm | 0mm | 0mm | 0mm | 0mm |
| 14 | 13 | 15 | 800mm | 4 | 55mm | 100mm | 0mm | 0mm | 0mm |
| 15 | 14 | 16 | 800mm | 4 | 55mm | 0mm | 0mm | 0mm | 0mm |
| 16 | 15 | 17 | 800mm | 4 | 55mm | 100mm | 0mm | 0mm | 0mm |
| 17 | 16 | 18 | 800mm | 4 | 55mm | 0mm | 0mm | 0mm | 0mm |
| 18 | 17 | -1 | 800mm | 4 | 55mm | 100mm | 0mm | 0mm | 0mm |
| 19 | -1 | 20 | 800mm | 3 | 55mm | 0mm | 0mm | 0mm | 0mm |
| 20 | 19 | 21 | 800mm | 3 | 55mm | 75mm | 0mm | 0mm | 0mm |
| 21 | 20 | 22 | 800mm | 3 | 55mm | 0mm | 0mm | 0mm | 0mm |

FIG. 17B

| POT NUMBER | UPPER POT NUMBER | LOWER POT NUMBER | MAXIMUM TOOL LENGTH | PRIORITY | L0 VALUE | L1 VALUE | L2 VALUE | L3 VALUE | L4 VALUE |
|---|---|---|---|---|---|---|---|---|---|
| 214 | -1 | 215 | 800mm | 5 | 55mm | 100mm | 160mm | 0mm | 0mm |
| 215 | 214 | 216 | 800mm | 5 | 55mm | 0mm | 0mm | 0mm | 0mm |
| 216 | 215 | 217 | 800mm | 5 | 55mm | 0mm | 0mm | 0mm | 0mm |
| 217 | 216 | 218 | 800mm | 5 | 55mm | 100mm | 160mm | 0mm | 0mm |
| 218 | 217 | 219 | 800mm | 5 | 55mm | 0mm | 0mm | 0mm | 0mm |
| 219 | 218 | -1 | 800mm | 4 | 55mm | 0mm | 0mm | 0mm | 0mm |
| 220 | -1 | 221 | 800mm | 4 | 55mm | 0mm | 0mm | 0mm | 0mm |
| 221 | 220 | 222 | 800mm | 5 | 55mm | 0mm | 0mm | 0mm | 0mm |
| 222 | 221 | 223 | 800mm | 5 | 55mm | 100mm | 160mm | 0mm | 0mm |
| 223 | 222 | 224 | 800mm | 5 | 55mm | 0mm | 0mm | 0mm | 0mm |
| 224 | 223 | 225 | 800mm | 5 | 55mm | 0mm | 160mm | 0mm | 0mm |
| 225 | 224 | 226 | 800mm | 5 | 55mm | 100mm | 0mm | 0mm | 0mm |
| 226 | 225 | 227 | 800mm | 5 | 55mm | 0mm | 0mm | 0mm | 0mm |
| 227 | 226 | 228 | 800mm | 5 | 55mm | 0mm | 0mm | 0mm | 0mm |
| 228 | 227 | -1 | 800mm | 5 | 55mm | 100mm | 160mm | 0mm | 0mm |
| 229 | -1 | 230 | 800mm | 5 | 55mm | 100mm | 160mm | 0mm | 0mm |
| 230 | 229 | 231 | 800mm | 5 | 55mm | 0mm | 0mm | 0mm | 0mm |
| 231 | 230 | 232 | 800mm | 5 | 55mm | 0mm | 0mm | 0mm | 0mm |
| 232 | 231 | 233 | 800mm | 5 | 55mm | 100mm | 160mm | 0mm | 0mm |
| 233 | 232 | 234 | 800mm | 5 | 55mm | 0mm | 0mm | 0mm | 0mm |
| 234 | 233 | 235 | 800mm | 5 | 55mm | 0mm | 0mm | 0mm | 0mm |
| 235 | 234 | 236 | 800mm | 5 | 55mm | 100mm | 160mm | 0mm | 0mm |
| 236 | 235 | 237 | 800mm | 5 | 55mm | 0mm | 0mm | 0mm | 0mm |
| 237 | 236 | 238 | 800mm | 5 | 55mm | 0mm | 0mm | 0mm | 0mm |
| 238 | 237 | 239 | 800mm | 5 | 55mm | 100mm | 160mm | 0mm | 0mm |
| 239 | 238 | 240 | 800mm | 5 | 55mm | 0mm | 0mm | 0mm | 0mm |
| 240 | 239 | -1 | 800mm | 9 | 0mm | 0mm | 0mm | 0mm | 0mm |

FIG. 21

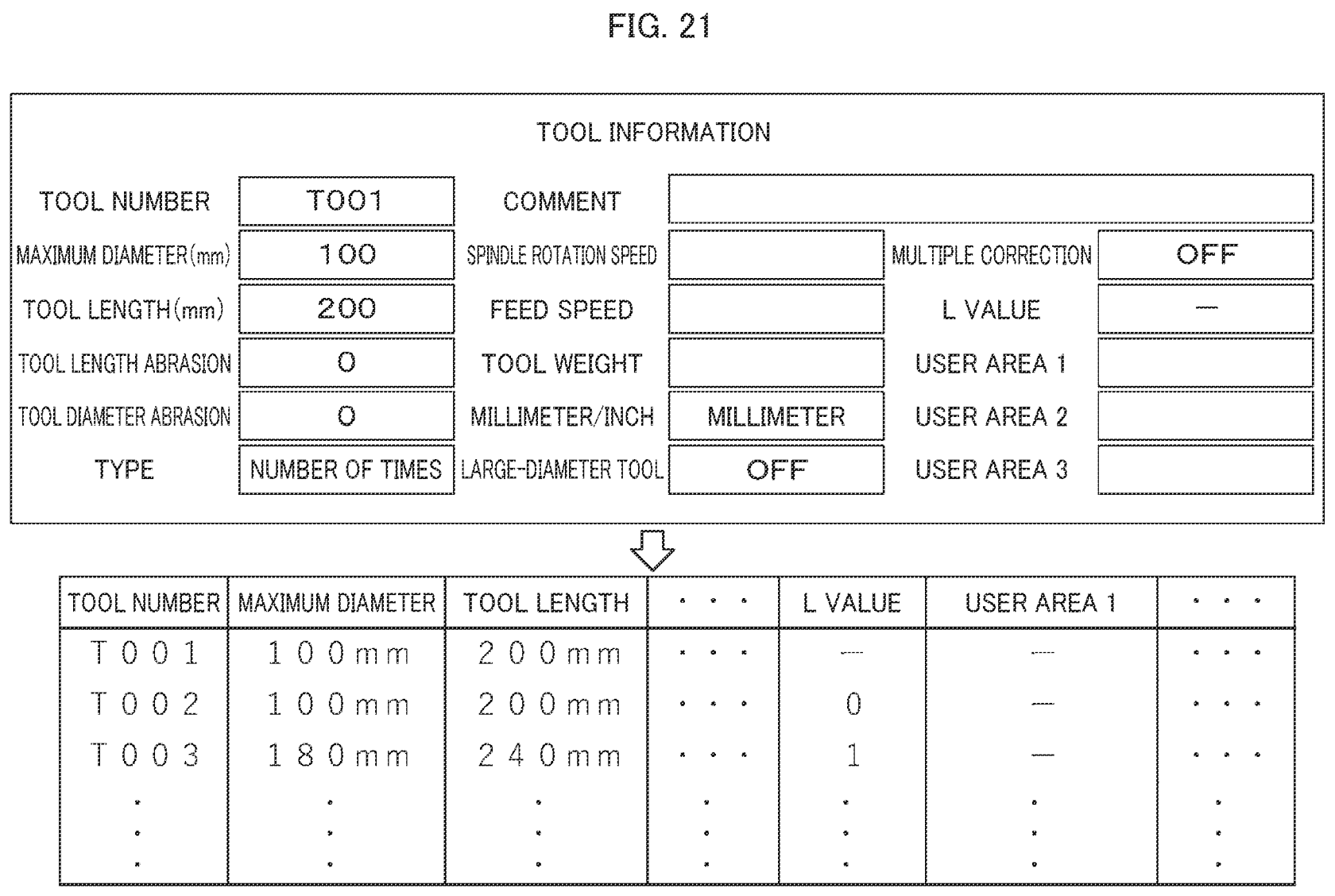

TOOL INFORMATION

| TOOL NUMBER | T001 | MULTIPLE CORRECTION | OFF |
|---|---|---|---|
| MAXIMUM DIAMETER(mm) | 100 | | |
| SPINDLE ROTATION SPEED | | L VALUE | — |
| TOOL LENGTH(mm) | 200 | | |
| FEED SPEED | | USER AREA 1 | |
| TOOL LENGTH ABRASION | 0 | | |
| TOOL WEIGHT | | USER AREA 2 | |
| TOOL DIAMETER ABRASION | 0 | | |
| MILLIMETER/INCH | MILLIMETER | USER AREA 3 | |
| TYPE | NUMBER OF TIMES | | |
| LARGE-DIAMETER TOOL | OFF | | |

| TOOL NUMBER | MAXIMUM DIAMETER | TOOL LENGTH | . . . | L VALUE | USER AREA 1 | . . . |
|---|---|---|---|---|---|---|
| T001 | 100mm | 200mm | . . . | — | — | . . . |
| T002 | 100mm | 200mm | . . . | 0 | — | . . . |
| T003 | 180mm | 240mm | . . . | 1 | — | . . . |
| . . . | . . . | . . . | . . . | . . . | . . . | . . . |

FIG. 23

| SUBCONDITION | L VALUE OF SELECTED TOOL | PERIPHERAL POT | WHETHER TOOL IS STORED | L VALUE OF STORED TOOL | DETERMINATION RESULT | NEXT DETERMINATION | FINAL DETERMINATION RESULT |
|---|---|---|---|---|---|---|---|
| L0−1A | 0 | ONE POT ABOVE | NO | — | OK | L0−2A | — |
| L0−1B | 0 | ONE POT ABOVE | YES | 0 | OK | L0+1A | — |
| L0−1C | 0 | ONE POT ABOVE | YES | 1~4 | NG | END | STORAGE IMPOSSIBLE |
| L0−2A | 0 | TWO POTS ABOVE | NO | — | OK | L0+1A | — |
| L0−2B | 0 | TWO POTS ABOVE | YES | 0~2 | OK | L0+1A | — |
| L0−2C | 0 | TWO POTS ABOVE | YES | 3, 4 | NG | END | STORAGE IMPOSSIBLE |
| L0+1A | 0 | ONE POT BELOW | NO | — | OK | L0+2A | — |
| L0+1B | 0 | ONE POT BELOW | YES | 0 | OK | END | STORAGE POSSIBLE |
| L0+1C | 0 | ONE POT BELOW | YES | 1~4 | NG | END | STORAGE IMPOSSIBLE |
| L0+2A | 0 | TWO POTS BELOW | NO | — | OK | END | STORAGE POSSIBLE |
| L0+2B | 0 | TWO POTS BELOW | YES | 0~2 | OK | END | STORAGE POSSIBLE |
| L0+2C | 0 | TWO POTS BELOW | YES | 3, 4 | NG | END | STORAGE IMPOSSIBLE |

FIG. 25

| SUBCONDITION | L VALUE OF SELECTED TOOL | PERIPHERAL POT | WHETHER TOOL IS STORED | L VALUE OF STORED TOOL | DETERMINATION RESULT | NEXT DETERMINATION | FINAL DETERMINATION RESULT |
|---|---|---|---|---|---|---|---|
| L1−1A | 1 | ONE POT ABOVE | NO | — | OK | L1−2A | — |
| L1−1B | 1 | ONE POT ABOVE | YES | 0~4 | NG | END | STORAGE IMPOSSIBLE |
| L1−2A | 1 | TWO POTS ABOVE | NO | — | OK | L1−3A | — |
| L1−2B | 1 | TWO POTS ABOVE | YES | 0, 1 | OK | L1+1A | — |
| L1−2C | 1 | TWO POTS ABOVE | YES | 2~4 | NG | END | STORAGE IMPOSSIBLE |
| L1−3A | 1 | THREE POTS ABOVE | NO | — | OK | L1+1A | — |
| L1−3B | 1 | THREE POTS ABOVE | YES | 0~3 | OK | L1+1A | — |
| L1−3C | 1 | THREE POTS ABOVE | YES | 4 | NG | END | STORAGE IMPOSSIBLE |
| L1+1A | 1 | ONE POT BELOW | NO | — | OK | L1+2A | — |
| L1+1B | 1 | ONE POT BELOW | YES | 0~4 | NG | END | STORAGE IMPOSSIBLE |
| L1+2A | 1 | TWO POTS BELOW | NO | — | OK | L1+3A | — |
| L1+2B | 1 | TWO POTS BELOW | YES | 0, 1 | OK | END | STORAGE POSSIBLE |
| L1+2C | 1 | TWO POTS BELOW | YES | 2~4 | NG | END | STORAGE IMPOSSIBLE |
| L1+3A | 1 | THREE POTS BELOW | NO | — | OK | END | STORAGE POSSIBLE |
| L1+3B | 1 | THREE POTS BELOW | YES | 0~3 | OK | END | STORAGE POSSIBLE |
| L1+3C | 1 | THREE POTS BELOW | YES | 4 | NG | END | STORAGE IMPOSSIBLE |

FIG. 26

| SUBCONDITION | L VALUE OF SELECTED TOOL | PERIPHERAL POT | WHETHER TOOL IS STORED | L VALUE OF STORED TOOL | DETERMINATION RESULT | NEXT DETERMINATION | FINAL DETERMINATION RESULT |
|---|---|---|---|---|---|---|---|
| L2 − 1 A | 2 | ONE POT ABOVE | NO | — | OK | L2 − 2 A | — |
| L2 − 1 B | 2 | ONE POT ABOVE | YES | 0 ~ 4 | NG | END | STORAGE IMPOSSIBLE |
| L2 − 2 A | 2 | TWO POTS ABOVE | NO | — | OK | L2 − 3 A | — |
| L2 − 2 B | 2 | TWO POTS ABOVE | YES | 0 | OK | L2 + 1 A | — |
| L2 − 2 C | 2 | TWO POTS ABOVE | YES | 1 ~ 4 | NG | END | STORAGE IMPOSSIBLE |
| L2 − 3 A | 2 | THREE POTS ABOVE | NO | — | OK | L2 + 1 A | — |
| L2 − 3 B | 2 | THREE POTS ABOVE | YES | 0 ~ 2 | OK | L2 + 1 A | — |
| L2 − 3 C | 2 | THREE POTS ABOVE | YES | 3 , 4 | NG | END | STORAGE IMPOSSIBLE |
| L2 + 1 A | 2 | ONE POT BELOW | NO | — | OK | L2 + 2 A | — |
| L2 + 1 B | 2 | ONE POT BELOW | YES | 0 ~ 4 | NG | END | STORAGE IMPOSSIBLE |
| L2 + 2 A | 2 | TWO POTS BELOW | NO | — | OK | L2 + 3 A | — |
| L2 + 2 B | 2 | TWO POTS BELOW | YES | 0 | OK | END | STORAGE POSSIBLE |
| L2 + 2 C | 2 | TWO POTS BELOW | YES | 1 ~ 4 | NG | END | STORAGE IMPOSSIBLE |
| L2 + 3 A | 2 | THREE POTS BELOW | NO | — | OK | END | STORAGE POSSIBLE |
| L2 + 3 B | 2 | THREE POTS BELOW | YES | 0 ~ 2 | OK | END | STORAGE POSSIBLE |
| L2 + 3 C | 2 | THREE POTS BELOW | YES | 3 , 4 | NG | END | STORAGE IMPOSSIBLE |

FIG. 27

| SUBCONDITION | L VALUE OF SELECTED TOOL | PERIPHERAL POT | WHETHER TOOL IS STORED | L VALUE OF STORED TOOL | DETERMINATION RESULT | NEXT DETERMINATION | FINAL DETERMINATION RESULT |
|---|---|---|---|---|---|---|---|
| L3−1A | 3 | ONE POT ABOVE | NO | — | OK | L3−2A | — |
| L3−1B | 3 | ONE POT ABOVE | YES | 0~4 | NG | END | STORAGE IMPOSSIBLE |
| L3−2A | 3 | TWO POTS ABOVE | NO | — | OK | L3−3A | — |
| L3−2B | 3 | TWO POTS ABOVE | YES | 0~4 | NG | END | STORAGE IMPOSSIBLE |
| L3−3A | 3 | THREE POTS ABOVE | NO | — | OK | L3−4A | — |
| L3−3B | 3 | THREE POTS ABOVE | YES | 0, 1 | OK | L3+1A | — |
| L3−3C | 3 | THREE POTS ABOVE | YES | 2~4 | NG | END | STORAGE IMPOSSIBLE |
| L3−4A | 3 | FOUR POTS ABOVE | NO | — | OK | L3+1A | — |
| L3−4B | 3 | FOUR POTS ABOVE | YES | 0~3 | OK | L3+1A | — |
| L3−4C | 3 | FOUR POTS ABOVE | YES | 4 | NG | END | STORAGE IMPOSSIBLE |
| L3+1A | 3 | ONE POT BELOW | NO | — | OK | L3+2A | — |
| L3+1B | 3 | ONE POT BELOW | YES | 0~4 | NG | END | STORAGE IMPOSSIBLE |
| L3+2A | 3 | TWO POTS BELOW | NO | — | OK | L3+3A | — |
| L3+2B | 3 | TWO POTS BELOW | YES | 0~4 | NG | END | STORAGE IMPOSSIBLE |
| L3+3A | 3 | THREE POTS BELOW | NO | — | OK | L3+4A | — |
| L3+3B | 3 | THREE POTS BELOW | YES | 0, 1 | OK | END | STORAGE POSSIBLE |
| L3+3C | 3 | THREE POTS BELOW | YES | 2~4 | NG | END | STORAGE IMPOSSIBLE |
| L3+4A | 3 | FOUR POTS BELOW | NO | — | OK | END | STORAGE POSSIBLE |
| L3+4B | 3 | FOUR POTS BELOW | YES | 0~3 | OK | END | STORAGE POSSIBLE |
| L3+4C | 3 | FOUR POTS BELOW | YES | 4 | NG | END | STORAGE IMPOSSIBLE |

FIG. 28

| SUBCONDITION | L VALUE OF SELECTED TOOL | PERIPHERAL POT | WHETHER TOOL IS STORED | L VALUE OF STORED TOOL | DETERMINATION RESULT | NEXT DETERMINATION | FINAL DETERMINATION RESULT |
|---|---|---|---|---|---|---|---|
| L 4 − 1 A | 4 | ONE POT ABOVE | NO | — | OK | L 4 − 2 A | — |
| L 4 − 1 B | 4 | ONE POT ABOVE | YES | 0 ~ 4 | NG | END | STORAGE IMPOSSIBLE |
| L 4 − 2 A | 4 | TWO POTS ABOVE | NO | — | OK | L 4 − 3 A | — |
| L 4 − 2 B | 4 | TWO POTS ABOVE | YES | 0 ~ 4 | NG | END | STORAGE IMPOSSIBLE |
| L 4 − 3 A | 4 | THREE POTS ABOVE | NO | — | OK | L 4 − 4 A | — |
| L 4 − 3 B | 4 | THREE POTS ABOVE | YES | 0 | OK | L 4 + 1 A | — |
| L 4 − 3 C | 4 | THREE POTS ABOVE | YES | 1 ~ 4 | NG | END | STORAGE IMPOSSIBLE |
| L 4 − 4 A | 4 | FOUR POTS ABOVE | NO | — | OK | L 4 + 1 A | — |
| L 4 − 4 B | 4 | FOUR POTS ABOVE | YES | 0 ~ 2 | OK | L 4 + 1 A | — |
| L 4 − 4 C | 4 | FOUR POTS ABOVE | YES | 3, 4 | NG | END | STORAGE IMPOSSIBLE |
| L 4 + 1 A | 4 | ONE POT BELOW | NO | — | OK | L 4 + 2 A | — |
| L 4 + 1 B | 4 | ONE POT BELOW | YES | 0 ~ 4 | NG | END | STORAGE IMPOSSIBLE |
| L 4 + 2 A | 4 | TWO POTS BELOW | NO | — | OK | L 4 + 3 A | — |
| L 4 + 2 B | 4 | TWO POTS BELOW | YES | 0 ~ 4 | NG | END | STORAGE IMPOSSIBLE |
| L 4 + 3 A | 4 | THREE POTS BELOW | NO | — | OK | L 4 + 4 A | — |
| L 4 + 3 B | 4 | THREE POTS BELOW | YES | 0 | OK | END | STORAGE POSSIBLE |
| L 4 + 3 C | 4 | THREE POTS BELOW | YES | 1 ~ 4 | NG | END | STORAGE IMPOSSIBLE |
| L 4 + 4 A | 4 | FOUR POTS BELOW | NO | — | OK | END | STORAGE POSSIBLE |
| L 4 + 4 B | 4 | FOUR POTS BELOW | YES | 0 ~ 2 | OK | END | STORAGE POSSIBLE |
| L 4 + 4 C | 4 | FOUR POTS BELOW | YES | 3, 4 | NG | END | STORAGE IMPOSSIBLE |

INFORMATION PROCESSING SYSTEM AND MACHINE TOOL

CROSS REFERENCE TO RELATED APPLICATIONS

This application is a continuation application of International Application No. PCT/JP2021/017388, filed on May 6, 2021, which claims priority to and the benefit of Japanese Patent Application No. 2020-111273, filed on Jun. 29, 2020. The contents of these applications are incorporated herein by reference in their entirety.

BACKGROUND OF INVENTION

1. Field

The present invention relates to a control technique for machine tools.

2. Description of Related Art

Some machine tools continuously perform machining with a tool while automatically changing a plurality of tools such as a drill and a milling cutter. These tools are stored in a magazine of the machine tool.

At the time of storing the tools in the magazine, contact or impact between adjacent ones of the tools needs to be avoided.

The tools are stored in a plurality of portions called pots provided in the magazine and storage conditions of the pots are not always the same. The various tools are different in the form or size.

RELATED ART LIST

Patent Literature 1: JP H11-042533 A
Patent Literature 2: JP H07-001272 A
To prevent interference, it is necessary to identify a pot in which a tool is to be stored according to the type of the tool to be stored. Conventionally, a worker stores each tool in a pot while checking the layout of the magazine and the dimension of the tool. Therefore, an error is likely to occur. Furthermore, the situation is complicated because interference may also be caused by tools previously stored in pots adjacent to a storage destination pot.

Patent Literatures 1 and 2 disclose techniques for determining interference in storage of tools. However, Patent Literature 1 focuses only on the correspondence relation between a magazine tool holder and tools and does not use arrangement information of magazine pots. Patent Literature 2 simply mentions the tool storage direction in a magazine and the distance between pots.

SUMMARY OF INVENTION

An information processing system according to an embodiment of the present invention includes: a request accepting unit for accepting a selected pot request for selecting a pot to store a tool selected to be stored in a pot of a machine tool magazine; a storing unit including a plurality of cells including a first cell and a second cell, in each of which a length from a predetermined position of each pot can be set, the storing unit for storing a setting value in each of the first cell and the second cell of the selected pot; a selecting unit for selecting the first cell or the second cell for the selected pot; a determining unit for determining whether a condition to store the selected tool in the selected pot is met on a basis of tool information including a size of each of tools that can be attached to a machine tool and a cell selected by the selecting unit, and magazine information including a storage condition of each of the pots for storing a tool in the magazine; and an informing unit for informing when the condition to store the selected tool in the selected pot is not met.

Further, the present invention provides a machine tool.

According to the present invention, appropriateness of selection of a magazine pot in which a tool is to be stored can be accurately determined.

BRIEF DESCRIPTION OF DRAWINGS

FIG. 1 is one example of a configuration diagram of a machine tool;

FIG. 4 is a data structure diagram of magazine definition information;

FIG. 5 is a data structure diagram of tool information;

FIG. 6 is a data structure diagram of a pot use status;

FIG. 14 is a perspective view of the turning center;

FIG. 15 is a perspective view of a magazine and an automatic tool changer (ATC) 300;

FIGS. 17A and 17B are data structure diagrams of magazine definition information in a first modification;

FIG. 21 is a diagram illustrating an example of a tool information input screen and a data structure of the tool information;

FIG. 23 is a data structure diagram of storage condition data of pots relating to a tool of the L0 value type;

FIG. 25 is a data structure diagram of storage condition data of pots relating to a tool of the L1 value type;

FIG. 26 is a data structure diagram of storage condition data of pots relating to a tool of the L2 value type;

FIG. 27 is a data structure diagram of storage condition data of pots relating to a tool of the L3 value type;

FIG. 28 is a data structure diagram of storage condition data of pots relating to a tool of the L4 value type;

DETAILED DESCRIPTION

Figure 1:
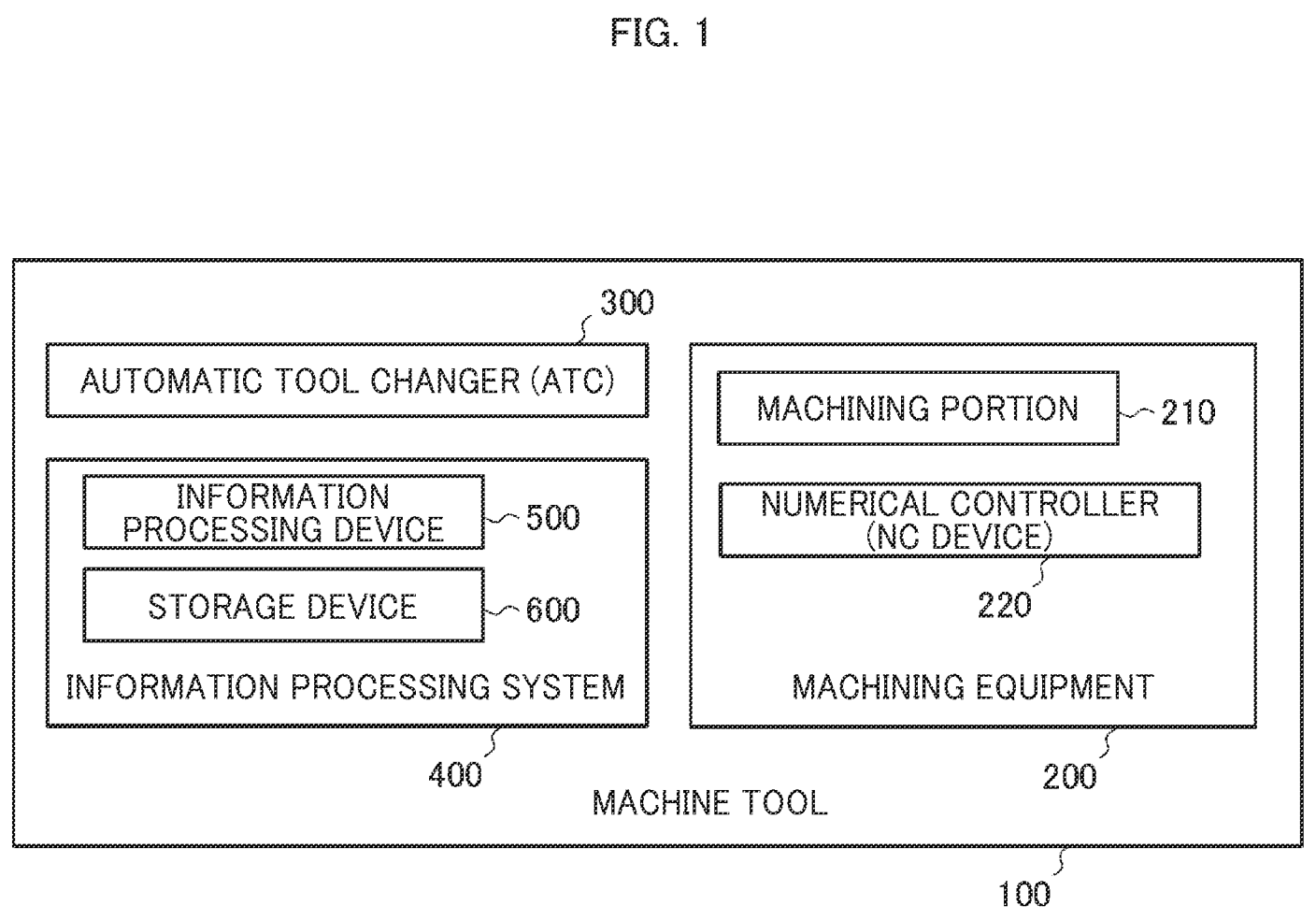

FIG. 1 is one example of the configuration diagram of a machine tool 100.

The machine tool 100 illustrated in FIG. 1 has machining equipment 200, an automatic tool changer (ATC) 300, and an information processing system 400. The machine tool 100 is a machining center, a turning center such as a lathe, a combined machine, or the like.

The machining equipment 200 is a device that performs machining by numerical control. The machining equipment 200 has a machining portion 210 and a numerical controller (NC device) 220. For example, in the case of a machining center, the machining portion 210 includes rotational shafts including a tool spindle, and a servomotor that drives these shafts, and performs machining such as drilling, milling, or boring while properly using various types of tools. A drill is used as a tool in the drilling, a milling cutter is used in the milling, and a reamer is used in the boring. These tools are identified by tool numbers.

The numerical controller (NC device) 220 controls the servomotor and the like in accordance with a program complying with standard specifications of the numerical control. This program is referred to as an NC (Numerical Control) program. NC instructions for causing the machining equipment 200 and the automatic tool changer (ATC) 300 to perform predetermined functions are described in the NC program. An operating system different from the operating system of an information processing device which will be described later is resident in the numerical controller (NC device) 220 and enables application programs to run. One of these programs is the NC program. The numerical controller (NC device) 220 includes a storing unit and may operate also in a mode storing tool information and the like.

The automatic tool changer (ATC) 300 has a function to automatically attach a tool to the spindle of the machining portion 210. The automatic tool changer (ATC) 300 has a magazine and an ATC unit as main components. The magazine is a device that accommodates a plurality of tools. The magazine performs an operation of indexing a tool designated by an NC instruction at a changing position. The magazine is also referred to as a tool magazine. Parts of the magazine where tools are stored are referred to as "pots".

In the case of a machining center, the ATC unit performs an operation of exchanging a tool attached to the spindle of the machining portion 210 for a tool indexed by the magazine. The ATC unit includes, for example, arms that simultaneously grasp these tools, and a cam mechanism that performs a series of operations. Tool storage equipment is a mechanism that stores, in a pot of the magazine, a tool having been inserted into a tool receiving port for taking in a tool to be stored in the magazine.

The machine tool 100 may be a turning center. As a reference, the outline of a turning center is explained with reference to FIGS. 2, 14, and 15.

Figure 2:
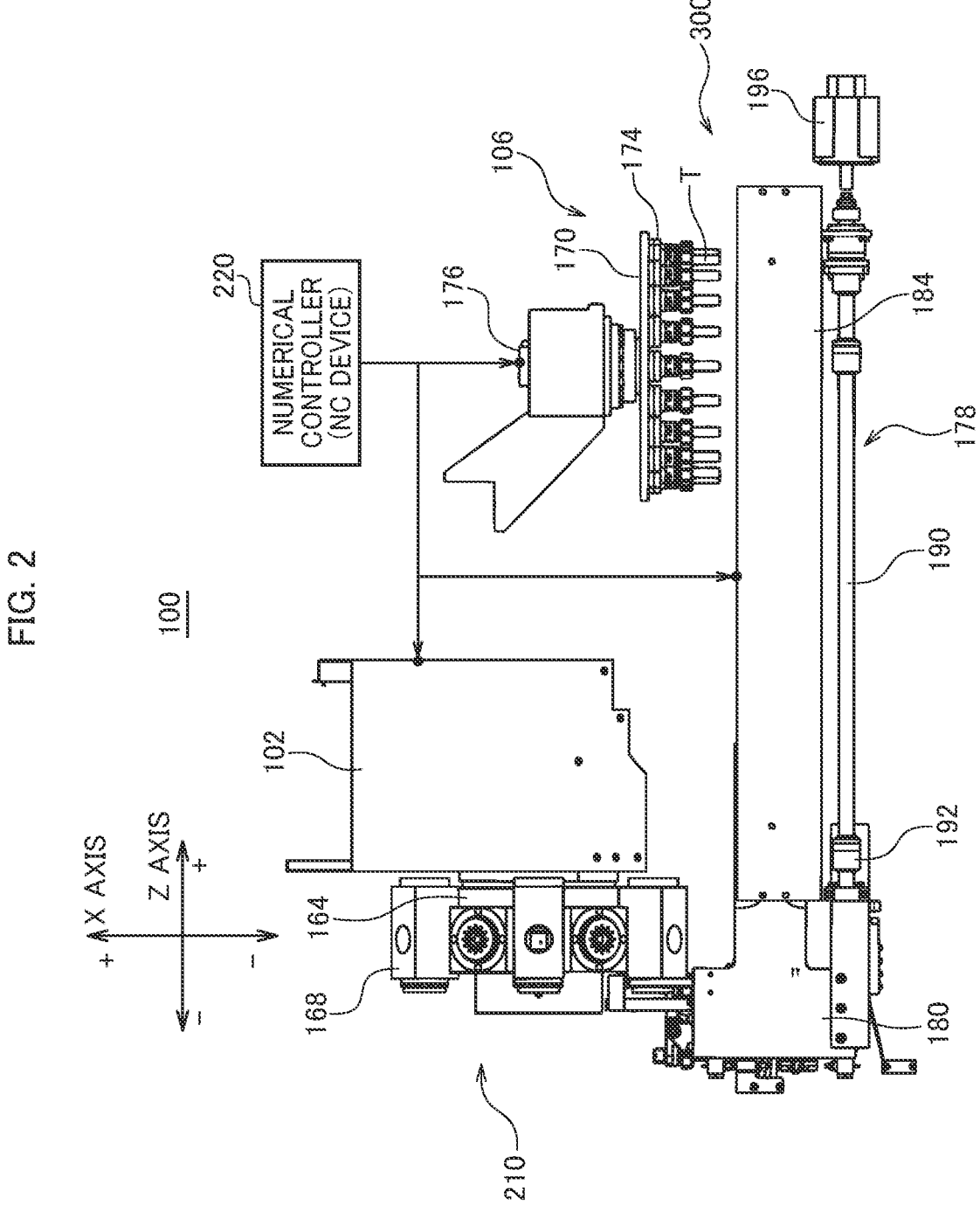
FIG. 2 is a plan view illustrating a schematic configuration of a turning center.

FIG. 2 is a plan view illustrating a schematic configuration of a turning center.

The turning center includes the numerical controller (NC device) 220, the machining portion 210, the automatic tool changer (ATC) 300, and a magazine 106. A turret base 102 and a turret 164 are movable in X, Y, and Z-axis directions. The turret base 102 and the turret 164 are collectively referred to as a tool rest in some cases, and only the turret 164 is referred to as a tool rest in other cases. FIG. 2 is a plan view seen in an X-Z direction plane. The turret 164 is installed on the turret base 102 to be rotatable around the Z axis. The magazine 106 is placed on a side of the turret base 102 in the Z-axis positive direction. The automatic tool changer (ATC) 300 transports a tool T.

Figure 14:
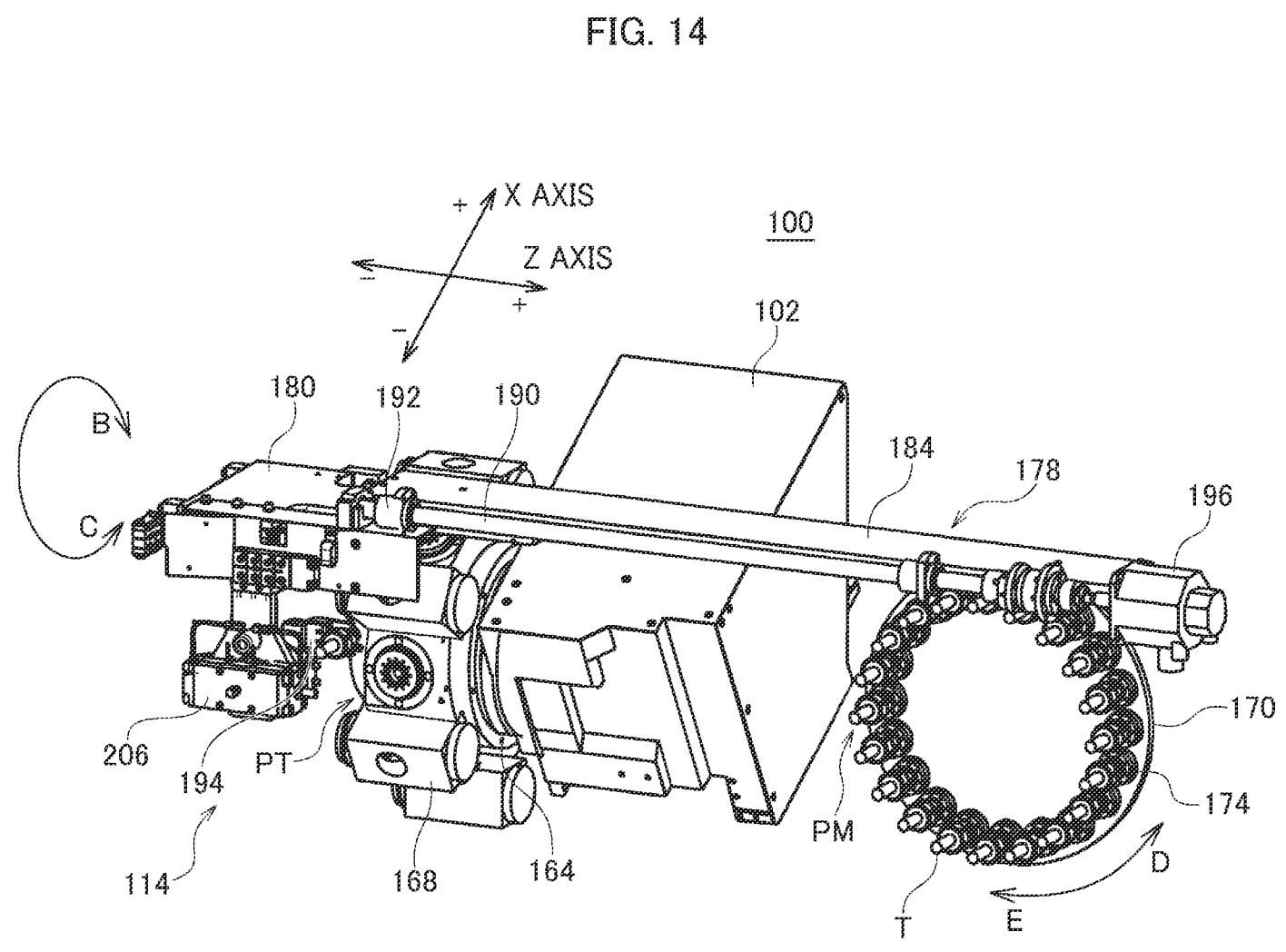

FIG. 14 is a perspective view of the turning center.

The turret 164 in a polygonal column shape includes a plurality of holders 168 for holding tools T on the outer periphery plane. The holders 168 are attached to a turret body so as to be detachable therefrom. A tool T attached to one of the holders 168 at a position PT is a detachment target. Each of the holders 168 can be indexed at the attach/detach position PT by rotating the turret 164 in B-C directions indicated by arrows (Z-axis rotation directions).

The magazine 106 includes a hold plate 170 provided to be rotatable in D-E directions indicated by arrows (X-axis rotation directions), hold pots 174 arranged at equal intervals on the periphery of the hold plate 170, and a drive motor 176 (see FIG. 15) rotating the hold plate 170. The hold pots 174 respectively hold the tools T. The hold pots 174 are protruded in the X-axis negative direction. A tool T in the hold pot 174 at a position PM is an attach/detach target. The drive motor 176 rotates the hold plate 170, thereby enabling each of the hold pots 174 to be indexed at the attach/detach position PM.

Figure 15:
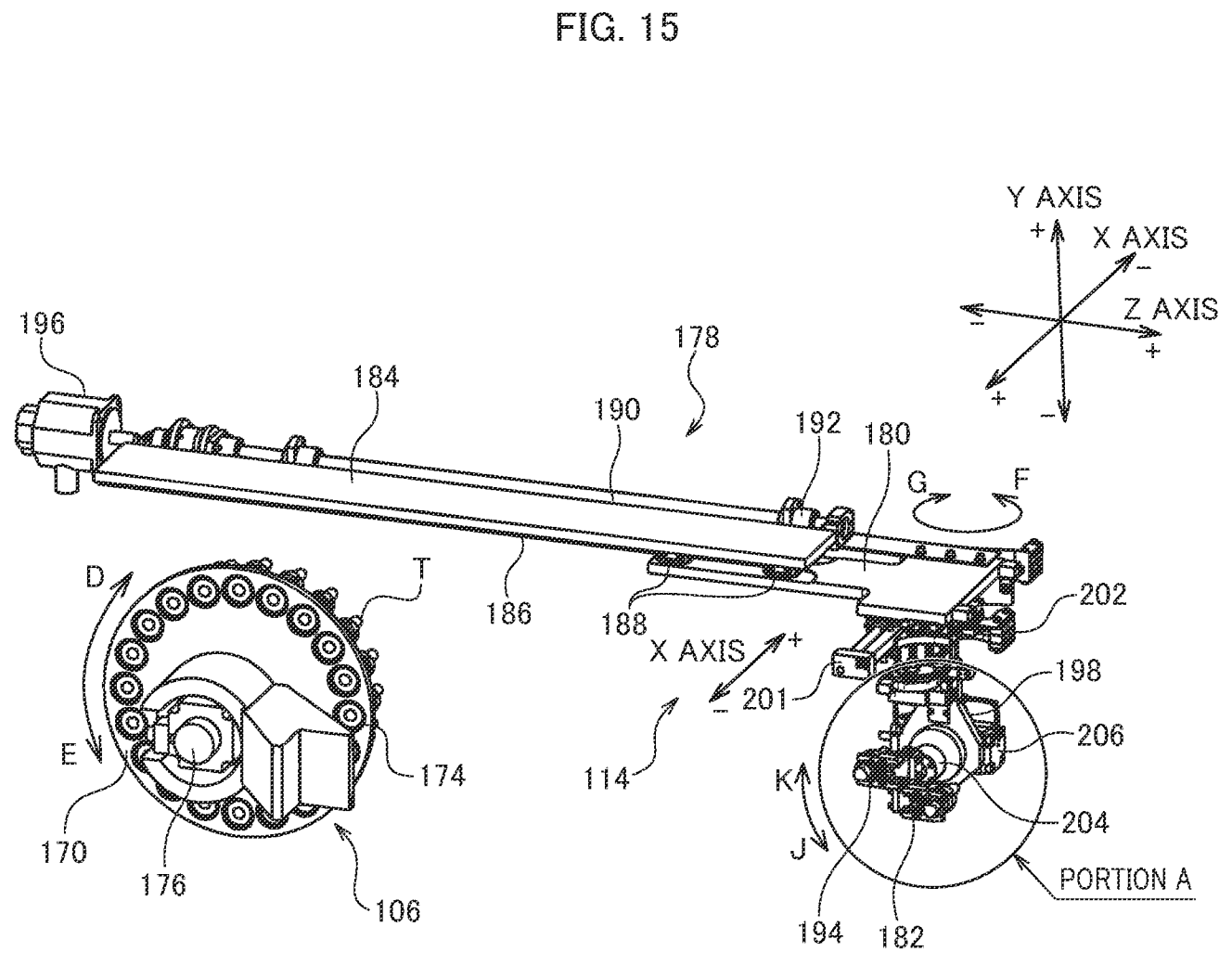

FIG. 15 is a perspective view of the magazine 106 and the automatic tool changer (ATC) 300.

The automatic tool changer (ATC) 300 is provided on the X-axis negative side of the turret base 102 and the magazine 106 (see FIG. 2). The automatic tool changer (ATC) 300 includes a feed mechanism 178 provided along the Z axis, a slide base 180 moved along the Z axis by the feed mechanism 178, a first hand 182 and a second hand 194 attached to the slide base 180, and the like.

The feed mechanism 178 includes a rail holding board 184 arranged in parallel to the Z axis, two guide rails 186 attached in parallel to the Z axis on the bottom side of the rail holding board 184, two sliders 188 provided to engage with each of the guide rails 186, a ball screw 190 arranged along the rail holding board 184, a ball nut 192 screwed on the ball screw 190, and a servomotor 196 coupled to an end part of the ball screw 190 to rotate the ball screw 190 around an axis. The sliders 188 are fixedly attached on the top side of the slide base 180.

A holding member 198 is arranged on the bottom side of the slide base 180 to be rotatable in F-G directions indicated by arrows (Y-axis rotation directions) and movable in the X-axis direction. The holding member 198 is driven in the X-axis direction by a movement cylinder 201. The holding member 198 is driven by a drive cylinder 202 via a mechanism such as a rack and pinion mechanism to turn in an angular range of 90 degrees in the F-G directions indicated by arrows. That is, the holding member 198 is configured to be movable in a plane in the X-Z directions and rotatable in the F-G directions. FIG. 15 illustrates a state in which the holding member 198 rotates in the F direction.

A rotation shaft 204 is attached through the holding member 198. The rotation shaft 204 is driven by a drive cylinder 206 via a mechanism such as a rack and pinion mechanism to rotate in an angular range of 180 degrees in J-K directions indicated by arrows.

Figure 16:
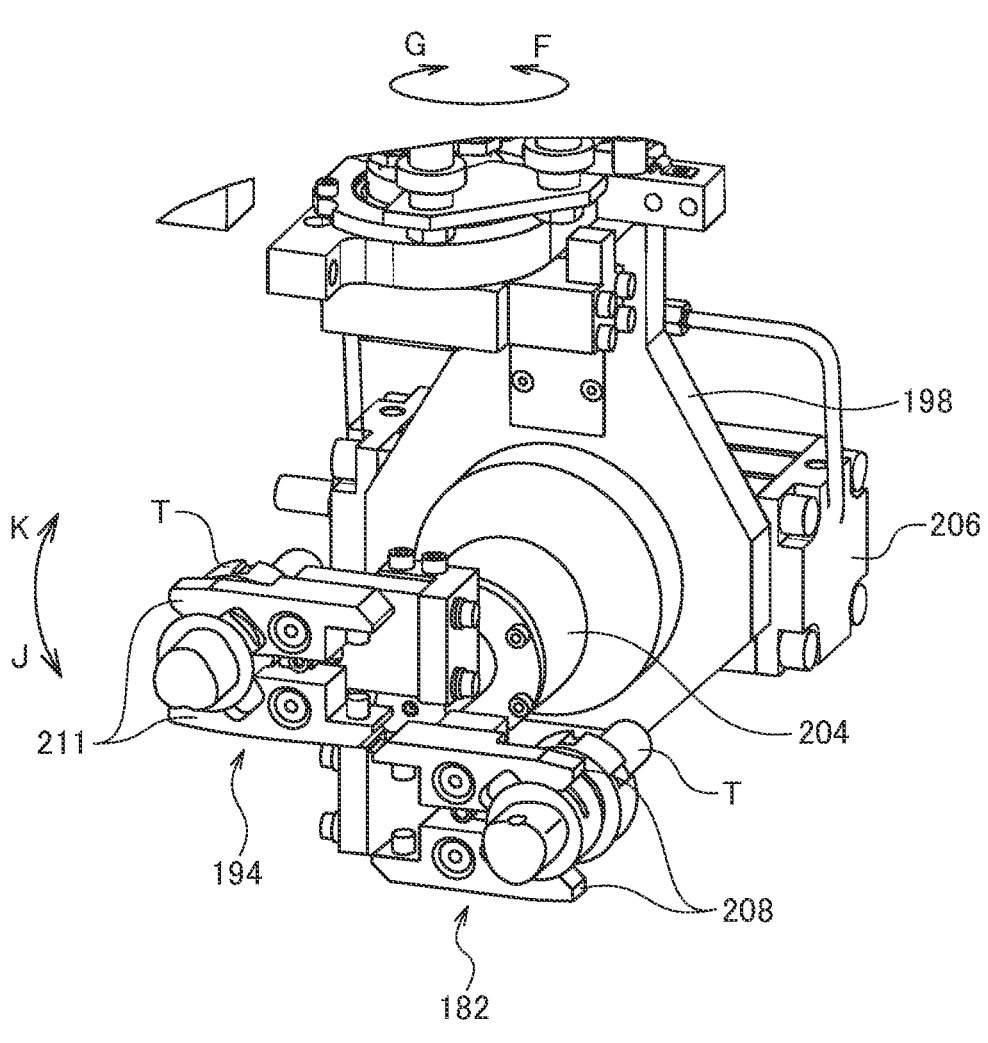
FIG. 16 is an enlarged perspective view of a portion A illustrated in FIG. 15.

FIG. 16 is an enlarged perspective view of a portion A illustrated in FIG. 15.

The first hand 182 and the second hand 194 are attached on an end part of the rotation shaft 204 to be point-symmetric with respect to the axial center of the rotation shaft 204 and in parallel to each other one above the other. The first hand 182 and the second hand 194 have the same configuration. The first hand 182 has a pair of grasping claws 208 for grasping a tool T and is capable of grasping a tool T with the grasping claws 208. Similarly, the second hand 194 has a pair of grasping claws 211 and is capable of grasping a tool T with the grasping claws 211.

When the holding member 198 is rotated in the arrow-indicated F direction (the rotation state illustrated in FIGS. 15 and 16), the grasping claws 208 and the grasping claws 211 of the first hand 182 and the second hand 194 are in positions along the Z-axis direction (an orthogonal direction orthogonal to the axis direction of a tool T grasped by the grasping claws 208 or the like). When the holding member 198 is rotated in the arrow-indicated G direction, the grasping claws 208 and the grasping claws 211 of the first hand 182 and the second hand 194 are in positions along the X-axis direction.

When the holding member 198 is located on a movement end on the X-axis positive side (this position is referred to as a "first X position") and on a rotation end in the F direction, a tool T held in the hold pot 174 indexed at the attach/detach position PM can be grasped by the first hand 182 or the second hand 194.

When the first hand 182 is grasping a tool T on the upper side and no tool T is held in the hold pot 174 at the attach/detach position PM, the tool T grasped by the first hand 182 can be stored in the hold pot 174 (empty hold pot) at the attach/detach position PM.

It is assumed that the slide base 180 is located at an intermediate position between the turret 164 and the magazine 106. The holding member 198 is then moved to a movement end in the X-axis negative direction (this position is referred to as a "second X position) and is rotated to a rotation end in the arrow-indicated F direction. Next, the slide base 180 is moved in the Z-axis positive direction to align the axial center (the X direction) of the tool T grasped by the first hand 182 with the axial center of the hold pot 174 (the Z coordinate at that time is referred to as a "first Z position"). Next, the holding member 198 is moved in the X-axis positive direction to the "first X position" and the tool T on the first hand 182 is loaded in the empty hold pot 174 at the attach/detach position PM. The slide base 180 is subsequently moved in the Z-axis negative direction (this position is referred to as a "second Z position"), so that the tool T grasped by the first hand 182 is released.

Meanwhile, when the first hand 182 is located on the upper side, no tool T is grasped by the grasping claws 208 of the first hand 182, and a tool T is held at the attach/detach position PM, the tool T at the attach/detach position PM can be taken out by the first hand 182.

It is assumed that the slide base 180 is located at an intermediate position between the turret 164 and the magazine 106. The holding member 198 is then rotated to the rotation end in the arrow-indicated F direction (the rotation state illustrated in FIGS. 15 and 16), the slide base 180 is moved to the "second Z position", the slide base 180 is subsequently moved to the "first X position", and then the slide base 180 is moved to the "first Z position". Accordingly, a tool T loaded at the attach/detach position PM enters an opening part of the pair of the grasping claws 208 and is grasped by the grasping claws 208. Next, the holding member 198 is moved to the "second X position". Accordingly, the tool T loaded in the hold pot 174 is taken out of the hold pot 174 while being grasped by the pair of the grasping claws 208.

In a type of the turret 164 in which a holder 168 indexed at the attach/detach position PT holds a tool T along the radial direction, the tool T held by the holder 168 can be grasped by the first hand 182 or the second hand 194 positioned on the lower side when the holding member 198 of the automatic tool changer (ATC) 300 is located at the "first X position" and at the rotation end in the arrow-indicated F direction.

When the first hand 182 is located on the upper side, the second hand 194 is located on the lower side, the first hand 182 is grasping a tool T, the second hand 194 is not grasping a tool T, and a tool T is held at the attach/detach position PT, the tool T grasped by the first hand 182 can be exchanged for the tool T held by the holder 168 at the attach/detach position PT.

It is assumed that the slide base 180 is located at an intermediate position between the turret 164 and the magazine 106. The slide base 180 is moved to a predetermined position (this position is referred to as a "third Z position") set in the Z-axis negative direction in a state where the holding member 198 is rotated to the rotation end in the arrow-indicated F direction and is moved to the "second X position". The "third Z position" is a position where the second hand 194 located on the lower side is positioned on the Z-axis positive side with respect to the tool T held by the holder 168, in other words, the second hand 194 is at a position in front of the tool T and does not interfere with the tool T when the holding member 198 is moved to the "first X position".

After the holding member 198 is moved to the "first X position", the slide base 180 is moved to a predetermined position (this position is referred to as a "fourth Z position") set in the Z-axis negative direction. Accordingly, the tool T at the attach/detach position PT enters an opening part of the pair of the grasping claws 211 and is grasped by the grasping claws 211. When the holding member 198 is subsequently moved to the "second X position", the tool T loaded in the holder 168 is taken out of the holder 168 by the pair of the grasping claws 211.

Next, the drive cylinder 206 interchanges the vertical positions of the first hand 182 and the second hand 194 to position the second hand 194 on the upper side and the first hand 182 on the lower side, and moves the holding member 198 to the "first X position". Accordingly, the tool T grasped by the first hand 182 is placed at the attach/detach position PT. When the slide base 180 is subsequently moved to the "third Z position", the tool T grasped by the first hand 182 is released. A tool T grasped by the first hand 182 and a tool T at the attach/detach position PT are exchanged by the first exchange operation described above. A tool T grasped by the second hand 194 can be stored in the magazine 106 by the storage operation described above.

In a case in which the holder 168 indexed at the attach/detach position PT of the turret 164 is of a type holding a tool T along the Z axis, the tool T held by the holder 168 can be grasped by the first hand 182 or the second hand 194 positioned on the lower side when the holding member 198 is located on the rotation end in the arrow-indicated G direction and at the "first X position".

When the first hand 182 is positioned on the upper side, the second hand 194 is positioned on the lower side, the first hand 182 is grasping a tool T, the second hand 194 is not grasping a tool T, and a tool T is held at the attach/detach position PT, the tool T grasped by the first hand 182 can be exchanged for the tool T at the attach/detach position PT.

It is assumed that the slide base 180 is located at an intermediate position between the turret 164 and the magazine 106. The holding member 198 is then rotated to the rotation end in the arrow-indicated G direction and is moved to the "second X position", and the slide base 180 is moved to the "third Z position" set in the Z-axis negative direction. At that time, the second hand 194 is at a position where it can grasp the tool T held by the holder 168.

Next, the holding member 198 is moved to the "first X position". Accordingly, the tool T at the attach/detach position PT enters the opening part of the pair of the grasping claws 211 and is grasped by the grasping claws 211. When the holding member 198 is subsequently moved to the "fourth Z position" set in the Z-axis negative direction, the tool T loaded in the holder 168 is taken out of the holder 168 by the grasping claws 211.

Next, the vertical positions of the first hand 182 and the second hand 194 are interchanged by the drive cylinder 206 to position the second hand 194 on the upper side and the first hand 182 on the lower side, and the slide base 180 is moved to the "third Z position". Accordingly, the tool T grasped by the first hand 182 is loaded on the attach/detach position PT. When the holding member 198 is subsequently moved to the "second X position", the tool T grasped by the first hand 182 is released. By the second exchange operation described above, the tool T grasped by the first hand 182 is exchanged for the tool T at the attach/detach position PT. The tool T grasped by the second hand 194 can be stored in the magazine 106 by the storage operation described above.

Returning to the explanations of FIG. 1, the information processing system 400 includes an information processing device 500 and a storage device 600. For example, a general-purpose operating system is resident in the information processing device 500 and enables various application programs to run. The information processing device 500 may have a form including an operation device and a display. The operation device is, for example, a console of the machine tool and is used to accept user operations. The operation device is, for example, a button or a touch panel. The display of the operation device may have a form displaying an operation screen for operating the control of the numerical controller described above. The display is used to display operation guides or statuses of the machine tool 100.

While the information processing system has a form displaying the display in the present embodiment, a form in which a display such as a liquid crystal display is provided at a part of the housing that constitutes the magazine to display necessary information may be adopted.

Figure 3:
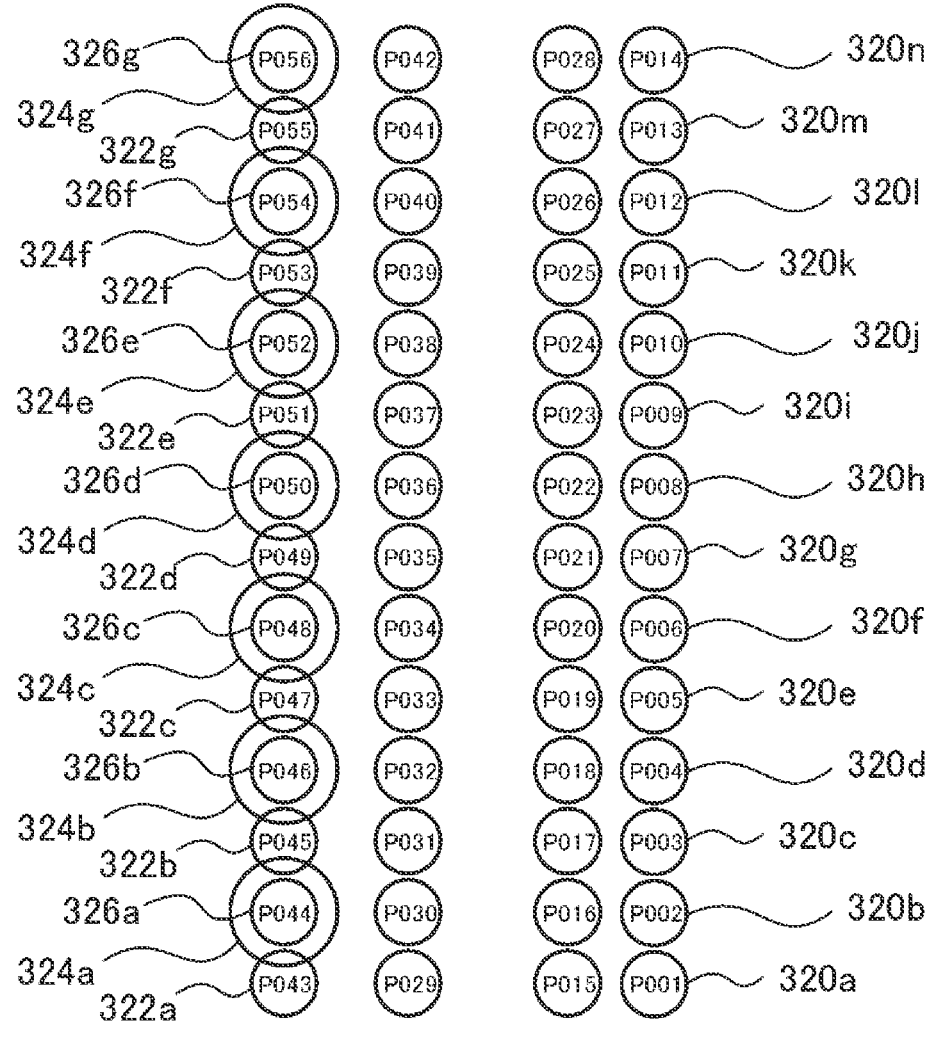
FIG. 3 is a tool interference diagram.

FIG. 3 is a tool interference diagram.

The tool interference diagram represents a range occupied by a tool stored in each pot in the rack magazine seen from the front direction. Overlapping of ranges occupied by tools respectively stored in adjacent two pots indicates that interference occurs between these tools.

Pots are arranged in four columns in the rack magazine in this example. The columns are referred to as a first column, a second column, a third column, and a fourth column from the right. In each column, 14 pots are arranged at equal intervals. The pots arranged from the lower side to the upper side are numbered first, second, . . . , and fourteenth. Circles 320a to 320n correspond to the pots in the first column. Circles 322a to 322g and circles 324a to 324g correspond to the pots in the fourth column. These circles represent the acceptable maximum diameters of tools stored in the pots, respectively. In short, when a tool protrudes from a circle, the tool is too large to be stored in the pot.

There is a sufficient space in the horizontal direction of the pots in the present embodiment and accordingly there is basically no concern about interference. Since the density is high in the vertical direction, it is necessary to take consideration so as not to cause interference. In this example, the distance between central points of vertically adjacent pots is 75 millimeters (mm).

The upper limit of the maximum diameter of tools that can be stored in each of pots in the first, second, and third columns is 70 mm. The circles 320a to 320n in the first column represent this diameter of 70 mm. The same holds for circles in the second column and circles in the third column. Regarding the pots in the first, second, and third columns, the circles do not overlap with that of an upper pot or a lower pot and no interference occurs between tools where the maximum diameter is the upper limit of 70 mm or less. There is a space of 5 mm between adjacent ones of the circles 320a to 320n in the first column.

In contrast thereto, determination conditions on the interference for the fourth column are a little more complicated. The upper limit of the maximum diameter of tools that can be stored in odd-numbered (first, third, . . . , and thirteenth) pots in the fourth column is 70 mm. The circles 322a to 322g in the fourth column respectively represent the diameter of 70 mm of each of the odd-numbered pots. Meanwhile, the upper limit of the maximum diameter of tools that can be stored in even-numbered (second, fourth, . . . , and fourteenth) pots is 120 mm. The circles 324a to 324g in the fourth column respectively represent the diameter of 120 mm of each of the even-numbered pots. Although many of tools used in this example have the maximum diameter equal to or less than 70 mm, some tools have the maximum diameter more than 70 mm. The even-numbered pots assume to store such large tools therein. The even-numbered pots can accommodate tools having the maximum diameter up to 120 mm. Of course, it is also allowable that general tools having the maximum diameter equal to or less than 70 mm are stored in the even-numbered pots. The circles 326a to 326g in the fourth column represent the diameter of 70 mm in each of the even-numbered pots.

When a general tool having the maximum diameter equal to or less than 70 mm is stored in the even-numbered pots in the fourth column, the tool does not interfere with a tool in the upper or lower pot. On the other hand, when a larger tool having the maximum diameter more than 70 mm is stored, the tool has a possibility of interfering with a tool in the upper or lower pot. Therefore, to store a large tool in an even-numbered pot in the fourth column, it is necessary to check that the tool does not interfere with the tool in the upper pot and the tool in the lower pot. For example, when a large tool having the maximum diameter of 110 mm is to be stored in a second pot (pot number P044, a pot corresponding to the circle denoted by reference 326a and the circle denoted by reference 324a), interference occurs when a general tool having the maximum diameter of 60 mm is already stored in a first pot (pot number P043, a pot corresponding to the circle denoted by reference 322a). Interference also occurs when a similar general tool is already stored in a third pot. That is, storage of a large tool in the second pot is allowed when the first pot and the third pot are both empty. It is also permissible to adopt a configuration in which storage of a large tool in the second pot is allowed when a tool is smaller than a general tool even when the tool is already stored in the first pot or the third pot.

Furthermore, in a state in which a large tool is already stored in an even-numbered pot in the fourth column, a tool cannot be stored in the upper pot or the lower pot in some cases. For example, when a general tool having the maximum diameter of 60 mm is to be stored in the first pot, interference occurs if a large tool having the maximum diameter of 110 mm is already stored in the second pot. However, when the tool in the second pot is a general one having the maximum diameter of 60 mm, no interference occurs and storage of the general tool in the first pot is allowed.

FIG. 4 is a data structure diagram of magazine definition information.

Specifications of each pot in the magazine are defined in the magazine definition information. In this example, the magazine definition information has a table format. The magazine definition information includes a record for each pot. The pot number, the upper pot number, the lower pot number, the upper limit of the maximum diameter as the operation rule, the upper limit of the length as the operation rule, the upper limit of the maximum diameter as the machinery limitation, and the upper limit of the length as the machinery limitation are set in the record.

The pot number is the identifier of a pot. The upper pot number identifies a pot located on the upper side of the pot. The lower pot number identifies a pot located on the lower side of the pot. The machinery limitation indicates conditions in which mechanical safety can be assured. However, in consideration of a higher level of safety, stricter conditions than the machinery limitation may be set as the operation rule. Alternatively, the operation rule may be the same conditions as those in the machinery limitation. However, laxer conditions than the machinery limitation cannot be set as the operation rule. Storage of a tool is rejected also when the tool does not conform to the operation rule.

FIG. 5 is a data structure diagram of tool information.

The dimension of each tool is defined in the tool information. In this example, the tool information has a table format. The tool information includes a record for each tool. The tool number, the maximum diameter, and the length are set in the record. The tool number is the identifier of a tool. The maximum diameter is the largest value of diameters of the tool in cross sections perpendicular to the rotation axis of the tool. The length is the length of the tool in the rotation axis direction.

FIG. 6 is a data structure diagram of a pot use status.

The pot use status of each of pots included in the magazine is set in the pot use status. In this example, the pot use status has a table format. The pot use status includes a record for each pot. The pot number, the tool number, and a use prohibition flag are set in the record. The pot number identifies a pot. The tool number identifies a tool stored in the pot. The use prohibition flag is ON when the pot is prohibited on the use.

Use prohibition of a pot is explained below. A pot may fail. If a tool is to be stored in a failed pot, a failure such as jam of the tool in the magazine occurs. If such a failure occurs, recovery work such as opening a cover and taking out the tool is required. In the present embodiment, a pot that cannot be used due to a failure or the like is managed as being prohibited on the use. Specifically, a user designates a pot number to prohibit the pot on the use. When the user intends to store a tool in the pot prohibited on the use, an associated storage request is denied.

Figure 7:
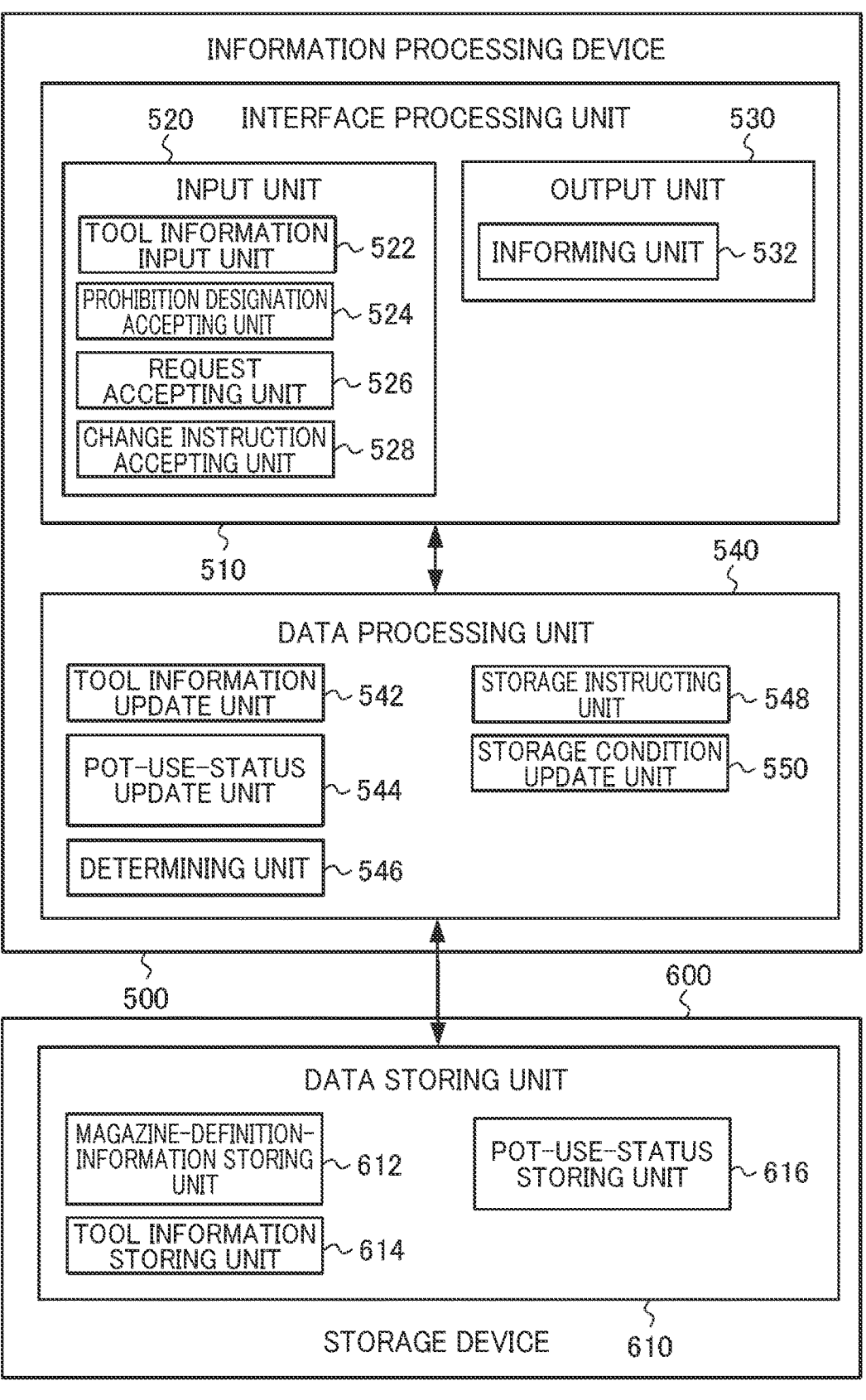
FIG. 7 is a functional block diagram of an information processing system.

FIG. 7 is a functional block diagram of the information processing system 400.

Constituent elements of the information processing device 500 are implemented by hardware including computing units such as central processing units (CPUs) and various co-processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Illustrated blocks do not indicate configurations in units of hardware but blocks in units of functions.

The information processing device 500 includes an interface processing unit 510 and a data processing unit 540. A storage device 600 is used as a data storing unit 610. The interface processing unit 510 performs user interface processes via an operation device, a display, or the like. The data processing unit 540 performs various processes on the basis of data input to the interface processing unit 510 and data stored in the data storing unit 610. The data storing unit 610 stores various data therein. The data processing unit 540 also functions as an interface of the interface processing unit 510 and the data storing unit 610.

The interface processing unit 510 includes an input unit 520 that accepts operation inputs made by an operator, and an output unit 530 that presents information to the operator.

The input unit 520 includes a tool information input unit 522, a prohibition designation accepting unit 524, a request accepting unit 526, and a change instruction accepting unit 528. The tool information input unit 522 inputs the tool information. The prohibition designation accepting unit 526 accepts the pot number of a pot to be prohibited on the use. The request accepting unit 526 accepts a storage request on a tool. The storage request on a tool includes the tool number for identifying the tool as a storage target, and a pot number for identifying a storage destination pot. The change instruction accepting unit 528 accepts a change instruction on the operation rule. The output unit 530 includes an informing unit 532 that issues information when storage of a tool is impossible.

The data processing unit 540 includes a tool information update unit 542, a pot-use-status update unit 544, a determining unit 546, a storage instructing unit 548, and a storage condition update unit 550.

The tool information update unit 542 updates the tool information (FIG. 5). The pot-use-status update unit 544 updates the pot use status (FIG. 6). The determining unit 546 determines whether a certain tool can be stored in a certain pot. The storage instructing unit 548 instructs the tool storage equipment or the automatic tool changer (ATC) 300 to store a certain tool in a certain pot. The storage condition update unit 550 updates the operation rule.

The data storing unit 610 includes a magazine-definition-information storing unit 612, a tool information storing unit 614, and a pot-use-status storing unit 616.

The magazine-definition-information storing unit 612 has the magazine definition information (FIG. 4) stored therein. The tool information storing unit 614 has the tool information (FIG. 5) stored therein. The pot-use-status storing unit 616 has the pot use status (FIG. 6) stored therein.

Figure 8:
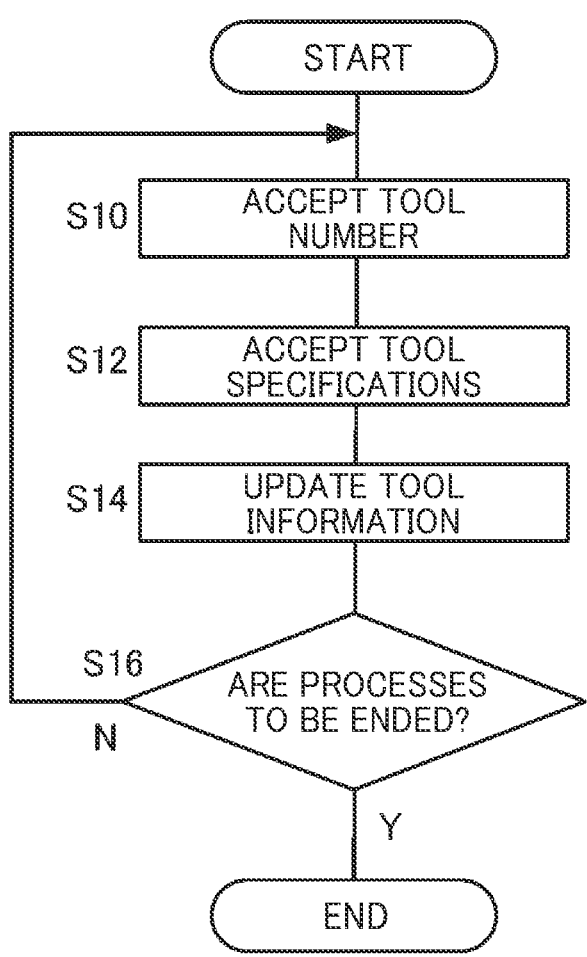
FIG. 8 is a flowchart illustrating processes to set the tool information.

FIG. 8 is a flowchart illustrating processes to set the tool information.

The tool information needs to be set in a preparatory stage. The tool information input unit 522 accepts the number (hereinafter, referred to as a "tool number") of a tool (for example, a drill or a milling cutter) that the user intends to newly register (S10). The tool information input unit 522 accepts specifications (hereinafter, referred to as "tool specifications") of the tool to be used by the user (S12). The tool specifications include the dimension (size) such as the maximum diameter and the length of the tool.

The tool information update unit 542 updates the tool information (FIG. 5) stored in the tool information storing unit 614 (S14). Specifically, a new record on a tool to be registered is added to the tool information. When determining the end of processes on the basis of an operation of an end button (Y in S16), the tool information input unit 522 ends the processes to set the tool information. On the other hand, when the processes are not to be ended (N in S16), the processes return to the process of S10 to accept another tool information.

Figure 9:
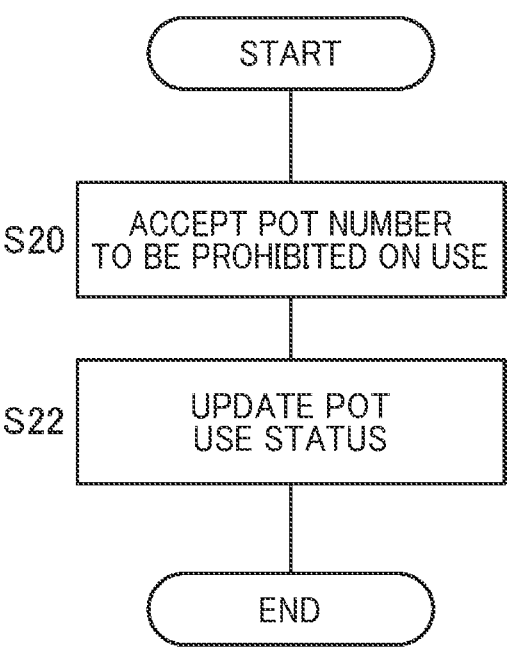
FIG. 9 is a flowchart illustrating processes to set pot use prohibition.

FIG. 9 is a flowchart illustrating processes to set pot use prohibition.

The prohibition designation accepting unit 524 accepts the pot number of a pot to be prohibited on the use by a user operation (S20). The pot-use-status update unit 544 sets the use prohibition flag corresponding to the pot number in the pot use status in the pot-use-status storing unit 616 to be ON (S22).

Storage of tools in the magazine is explained next.

Figure 10:
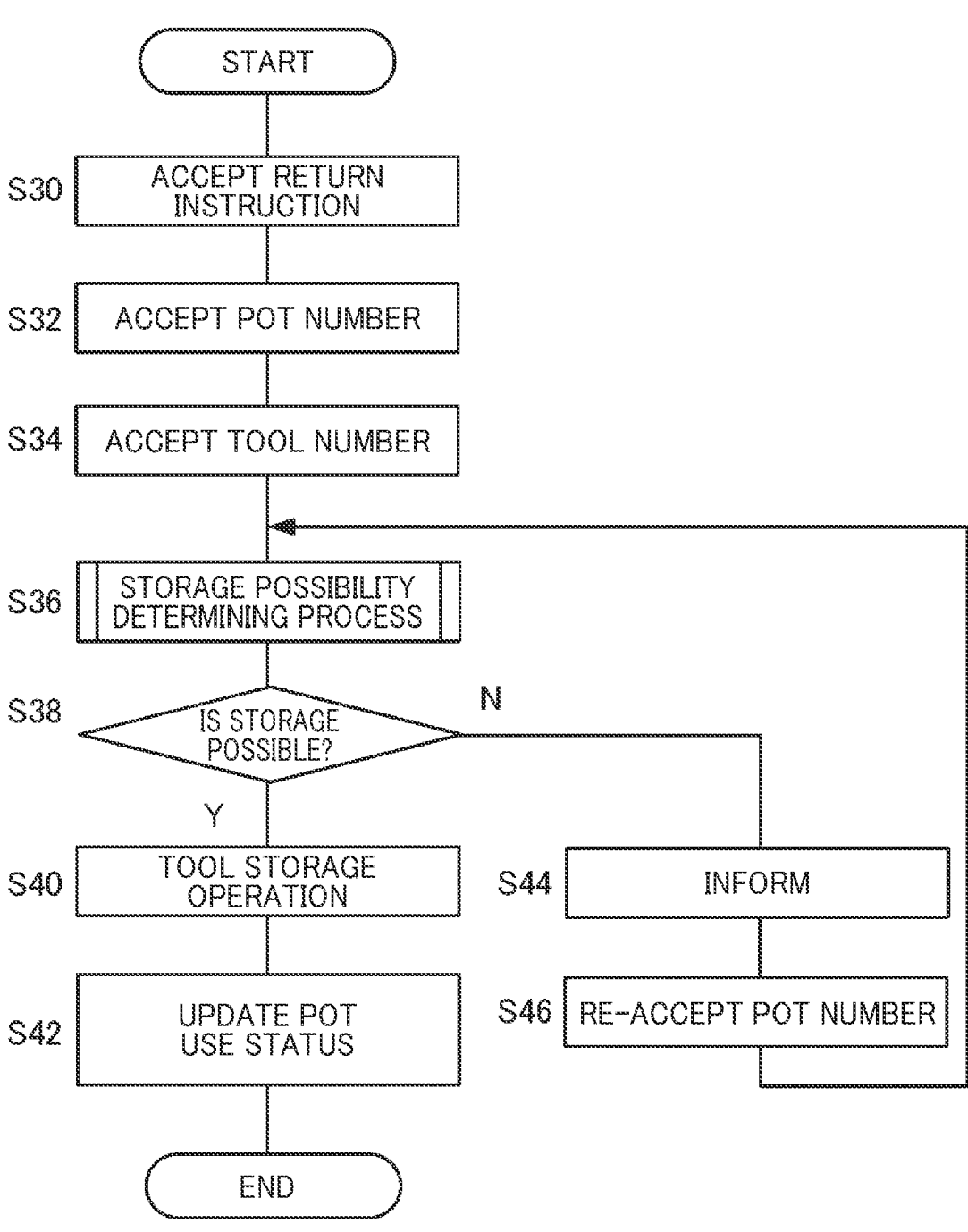
FIG. 10 is a flowchart illustrating processes of tool storage.

FIG. 10 is a flowchart illustrating processes of tool storage.

The user inserts a tool to be stored in a tool receiving port provided in the magazine and operates a storage button of the console attached to the housing of the magazine. When the input unit 520 accepts the operation of the storage button (S30), the output unit 530 displays an input screen for inputting a pot number and a tool number, and the request accepting unit 526 accepts the pot number (S32) and further accepts the tool number (S34). For example, when the user intends to store a tool having the tool number: T020 in a pot having the pot number: P010, inputs of the pot number "P010" and the tool number "T020" are accepted.

The determining unit 546 performs a storage possibility determining process (S36). Whether a designated certain tool can be stored in a designated certain pot is determined in the storage possibility determining process. Details of the storage possibility determining process will be described with reference to FIGS. 11 to 13.

When it is determined that the certain tool can be stored in the certain pot (Y in S38), the storage instructing unit 548 instructs the tool storage equipment to store the certain tool in the certain pot. The instructed tool storage equipment performs an operation of storing the certain tool inserted in the tool receiving port in the designated pot (S40). The pot-use-status update unit 544 updates the pot use status (S42). Specifically, the tool number of the stored tool is set to be associated with the pot number of the pot having the tool stored therein.

On the other hand, when it is determined in the storage possibility determining process (S36) that the certain tool cannot be stored in the certain pot (N in S38), the informing unit 532 informs that storage is impossible (S44). The informing unit 532 outputs, for example, display and audio indicating "this tool cannot be stored in the designated pot". The informing unit 532 may also output the tool number and the pot number. Furthermore, the informing unit 532 may output the reason for the storage impossibility. For example, the reason that "this tool cannot be stored in the designated pot because the pot is prohibited on the use" is output. When there is a pot that can store the tool, display or informing indicating "the tool number T001 can be stored in the pot number P056" may be performed.

When the storage is impossible, the user can designate another pot. That is, the pot in which the tool is to be stored can be changed. The output unit 530 displays a re-input screen for indicating the tool number previously input and enabling a pot number to be re-input, and the request accepting unit 526 accepts the pot number afresh (S46). The determining unit 546 performs the storage possibility determining process again (S36). When the request accepting unit 526 accepts a cancel instruction, the processes are ended without performing the tool storage.

While the flowchart illustrating the preceding processes of tool storage has been explained by an example in which the tool storage equipment in the magazine holds a tool at the receiving port of the magazine and stores the tool in a pot of the magazine, the tool storage is not limited to this form. An alternative form may be adopted in which a tool is attached to the tool spindle, whether the tool can be stored in a pot is determined, and the tool is stored in the pot by the automatic tool changer 300 when the tool can be stored in the pot.

Figure 11:
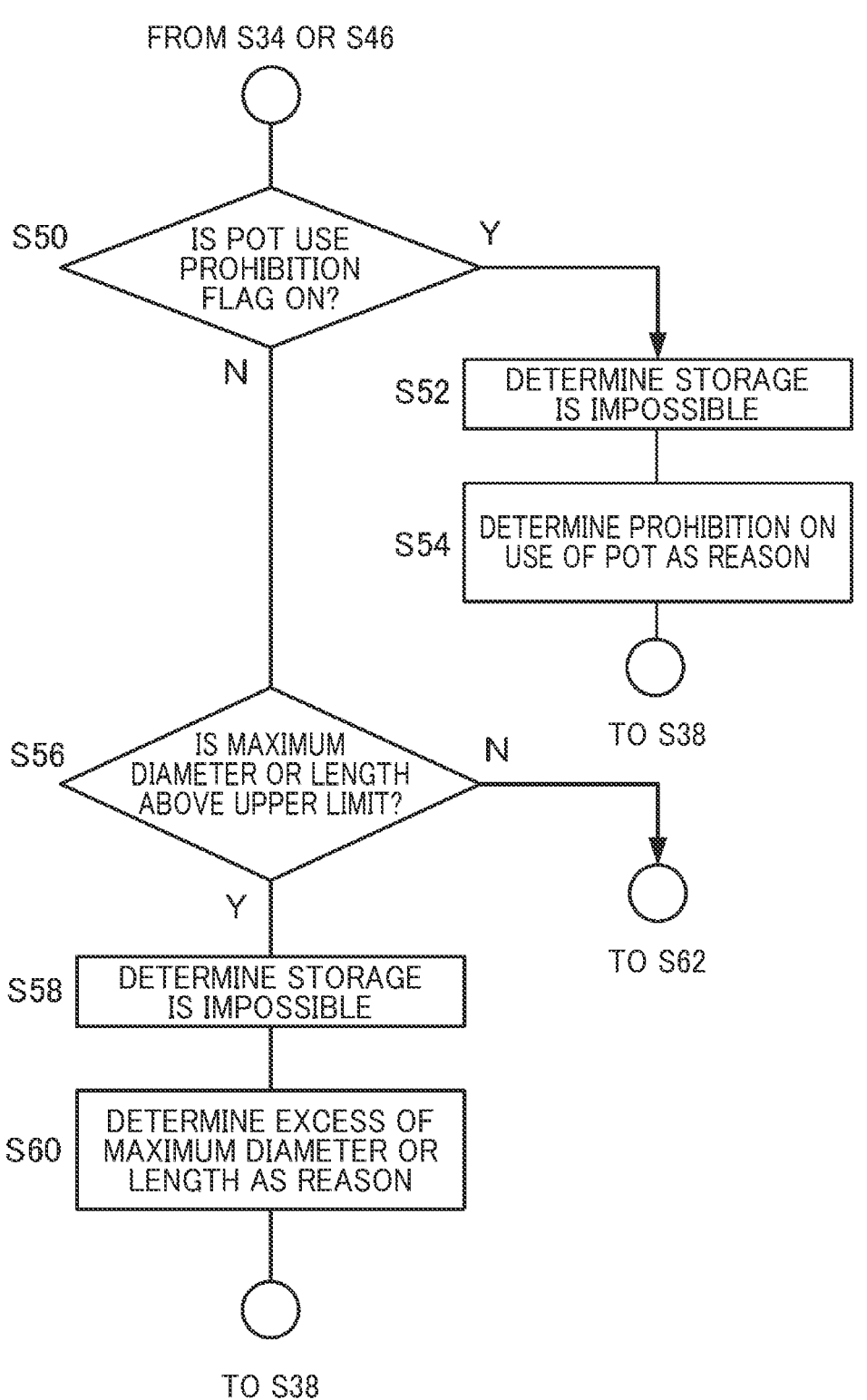
FIG. 11 is a flowchart illustrating processes of storage possibility determination.
Figure 12:
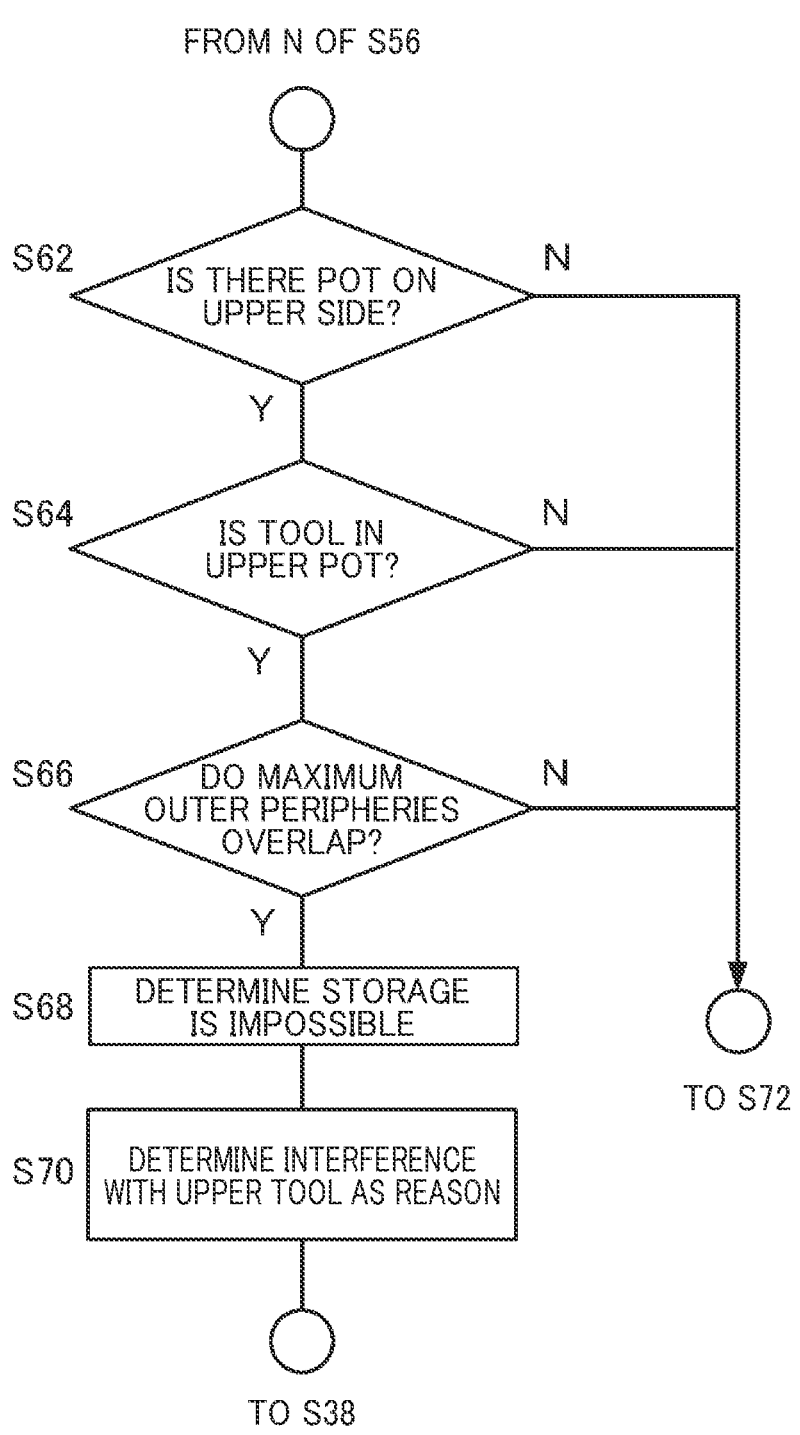
FIG. 12 is a flowchart illustrating processes of the storage possibility determination.
Figure 13:
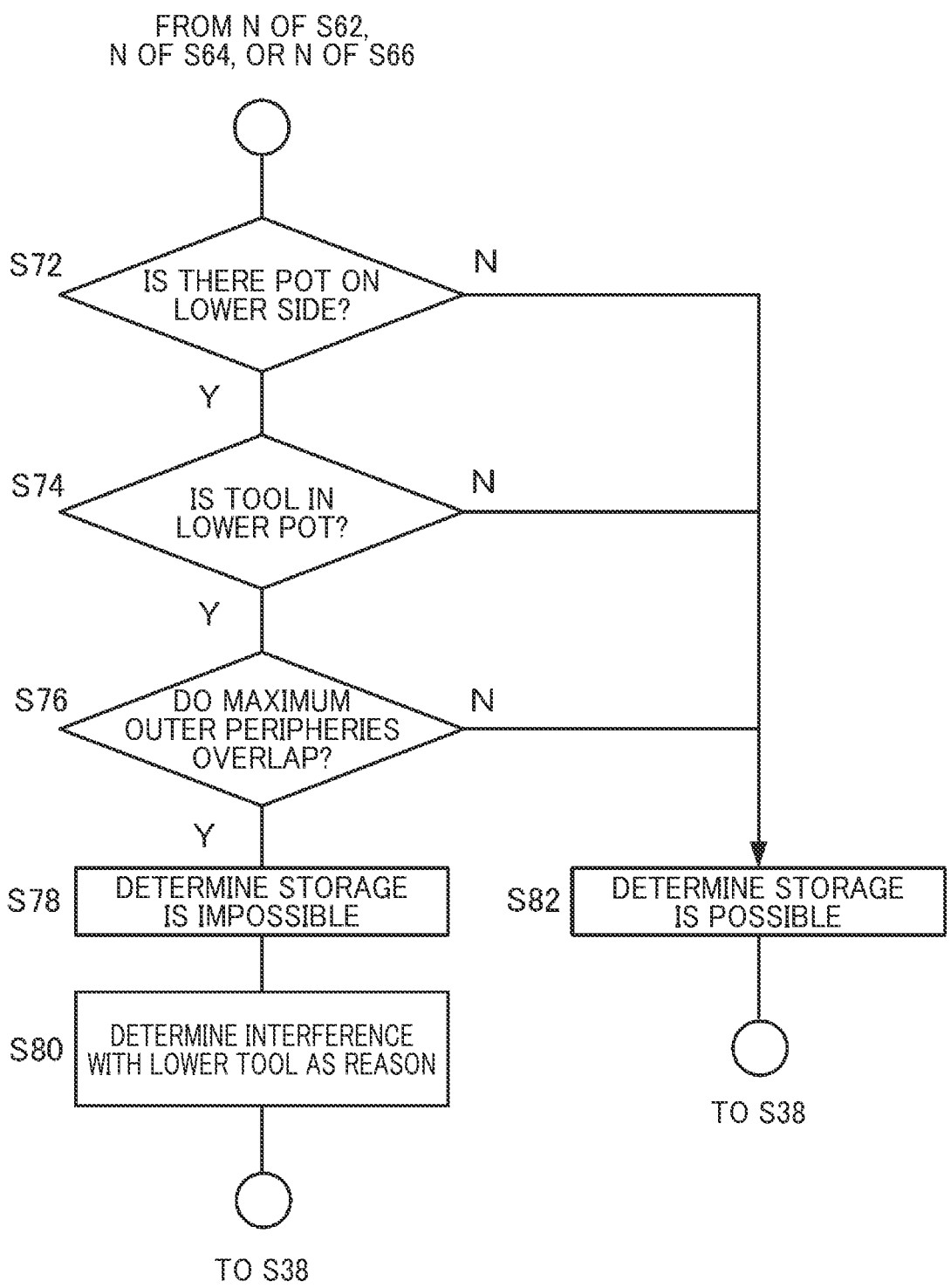
FIG. 13 is a flowchart illustrating processes of the storage possibility determination.

FIGS. 11, 12, and 13 are flowcharts illustrating processes of the storage possibility determination.

In the storage possibility determining process, the determining unit 546 determines whether a designated tool can be stored in a designated pot. First, when determining that the use prohibition flag of the designated pot is ON (Y in S50), the determining unit 546 determines that storage is impossible (S52). At that time, the determining unit 546 determines the reason why the storage is impossible is "because the pot is prohibited on the use" (S54). The processes then proceed to the process of S38.

When determining that the use prohibition flag of the designated pot is OFF (N in S50), the determining unit 546 subsequently determines whether the maximum diameter or the length of the tool is above the upper limit (S56). The determining unit 546 reads the maximum diameter and the length of the designated tool from the tool information. The determining unit 546 also reads the upper limit of the maximum diameter and the length of tools that can be stored in the designated pot from the magazine definition information. It is assumed that the operation rule is used in this example. When the maximum diameter of the designated tool is above the upper limit of the maximum diameter of tools that can be stored in the designated pot (Y in S56), the determining unit 546 determines that the storage is impossible (S58). Also when the length of the designated tool is above the upper limit of the length of tools that can be stored in the designated pot (Y in S56), the determining unit 546 determines that the storage is impossible (S58). In this case, the determining unit 546 determines the reason why the storage is impossible is "because the maximum diameter is above the upper limit" or "because the length is above the upper limit" (S60). The processes then proceed to the process of S38.

When the maximum diameter of the designated tool is not above the upper limit of the maximum diameter of tools that can be stored in the designated pot and the length of the designated tool is not above the upper limit (N in S56), the processes proceed to a process of S62 illustrated in FIG. 12.

The determining unit 546 determines in S62 to S66 whether interference with an upper tool occurs. The determining unit 546 determines that interference with an upper tool occurs when there is a pot on the upper side (Y in S62), when a tool is in the upper pot (Y in S64), and when the maximum outer periphery overlaps with that of the tool in the upper pot (Y in S66). In this case, the determining unit 546 determines that the storage is impossible (S68). The determining unit 546 subsequently determines the reason why the storage is impossible is "because the tool interferes with the upper tool" (S70). The processes then proceed to the process of S38.

The determination of S66 on whether the maximum outer periphery overlaps is explained. The distance between the center of the designated pot and the center of the upper pot is assumed as Lu. When the maximum diameter of the designated tool is denoted by Da and the maximum diameter of a tool in the upper pot is denoted by Db, a condition in which the maximum outer peripheries overlap with each other is that (Da+Db)/2 is equal to or more than Lu. The determining unit 546 determines that the maximum outer periphery overlaps with that of the tool in the upper pot when this condition is met. The comparison with Lu may be performed after a margin value is added to (Da+Db)/2. The margin value is intended to provide a margin space between the designated tool and the upper tool to enhance the safety level.

When the determining unit 546 determines that there is no pot on the upper side (N in S62), no interference with an upper tool occurs. Also when the determining unit 546 determines that no tool is in the upper pot (N in S64), no interference with an upper tool occurs. Even when a tool is in the upper pot, no interference with the upper tool occurs when the determining unit 546 determines that the maximum outer periphery does not overlap with that of the tool in the upper pot (N in S66). When interference with an upper tool does not occur, the processes proceed to a process of S72 illustrated in FIG. 13.

Subsequently, the determining unit 546 determines in S72 to S76 whether interference with a lower tool occurs. The determining unit 546 determines that interference with a lower tool occurs when there is a pot on the lower side (Y in S72), when a tool is in the lower pot (Y in S74), and when the maximum outer periphery overlaps with that of the tool in the lower pot (Y in S76). In this case, the determining unit 546 determines that the storage is impossible (S78). The determining unit 546 determines the reason why the storage is impossible is "because the tool interferes with the lower tool" (S80). The processes then proceed to the process of S38.

The determination of S76 on whether the maximum outer periphery overlaps is explained. The distance between the center of the designated pot and the center of the lower pot is assumed as Ld. When the maximum diameter of the designated tool is denoted by Da and the maximum diameter of a tool in the lower pot is denoted by Dc, a condition in which the maximum outer peripheries overlap with each other is that (Da+Dc)/2 is equal to or more than Ld. The determining unit 546 determines that the maximum outer periphery overlaps with that of the tool in the lower pot when this condition is met. The comparison with Ld may be performed after a margin value is added to (Da+Dc)/2. The margin value is intended to provide a margin space between the designated tool and the lower tool to enhance the safety level.

Meanwhile, when the determining unit 546 determines that there is no pot on the lower side (N in S72), no interference with a lower tool occurs. Also when the determining unit 546 determines that no tool is in the lower pot (N in S74), no interference with a lower tool occurs. Even when a tool is in the lower pot, no interference with the lower tool occurs when the determining unit 546 determines that the maximum outer periphery does not overlap with that of the tool in the lower pot (N in S76).

When interference with a lower tool does not occur, the determining unit 546 determines that the storage is possible (S82). The processes then proceed to the process of S38.

It is also allowable that the user can change the storage conditions on pots. For example, it is also allowable that changes of the operation rule in a range not exceeding the machinery limitation can be performed in the magazine definition information. Specifically, the output unit 530 displays a screen for inputting a change target pot, and the upper limit of the maximum diameter and the length as a new operation rule. When the change instruction accepting unit 528 accepts a pot number for identifying the change target pot, the output unit 530 displays the upper limit of the maximum diameter and the length as the current operation rule and the upper limit of the maximum diameter and the length as the machinery limitation, for the target pot. The user determines a new operation rule with referring to these values. When the input upper limit of the maximum diameter as the new operation rule is above the upper limit of the maximum diameter as the machinery limitation, the change instruction accepting unit 528 does not accept the input. When the input upper limit of the length as the new operation rule is above the upper limit of the length as the machinery limitation, the change instruction accepting unit 528 does not accept the input. When the change instruction accepting unit 528 accepts the upper limit of the maximum diameter and the length as the new operation rule, the storage condition update unit 550 updates the upper limit of the maximum diameter and the length as the operation rule for the change target pot in the magazine definition information. It is also allowable that the change instruction accepting unit 528 can change only the upper limit of the maximum diameter, or can change only the upper limit of the length.

First Modification

In the present embodiment, an example has been described in which the upper limit of the maximum diameter as the operation rule and the upper limit of the maximum diameter as the machinery limitation are set as conditions on diameters (the diameters or the radii) of tools that can be stored in each pot in the magazine definition information. In a first modification, an example in which a plurality of setting values are provided in regard to the length in the radial direction of a tool from the center of each pot is explained.

FIGS. 17A and 17B are data structure diagrams of the magazine definition information in the first modification.

In the magazine definition information, five setting values including an L0 value, an L1 value, an L2 value, an L3 value, and an L4 value can be set as the length in the radial direction of a tool from the center of each pot. While it suffices that the number of setting values is equal to or more than two, it is desirable that four to eight setting values can be set to enable a variety of setting. It is unnecessary to use all the setting values and only some of the setting values may be used. Values may be set for two of the five setting values, for example, the L0 value and the L4 value. While an example in which the values are set to increase from the L0 value, the L1 value, the L2 value, the L3 value, to the L4 value in this order is described below, the values do not necessarily increase in this order. The L0 value is not always the smallest. The number of setting values may be more than five. For example, setting values of an L5 value and subsequent values may be set.

The setting value set as each of the L0 value, the L1 value, the L2 value, the L3 value, and the L4 value does not need to be common to a plurality of pots. The user can freely set different setting values for each pot. In the present embodiment, the setting values on the length from a predetermined position (for example, the center) of each pot can be set in the magazine definition information. This is not to intend to set the shape, the size, and the like of each tool in the tool information. By thus enabling the setting values on the length in the radial direction of a tool to be freely set for each pot, the user can freely set the way to use of each pot and flexibly manage storage of tools in the magazine.

For example, it is assumed that the size of a pot is 60 mm, the L0 value of the diameter of tools that can be stored therein is set to 55 mm, and the L1 value of the diameter of tools that can be stored therein is set to 110 mm. In this case, even when the diameter of a tool that is actually to be stored is 50 mm, the L1 value (120 mm) can be selected as a selected cell in the tool information. In a peripheral pot (the size of the pot is 60 mm) adjacent to a pot in which the tool of 50 mm is to be stored, the tool can be stored when the L0 value (60 mm) is selected. However, since the L1 value is selected as the selected cell in this case, a state in which no tool is stored in the adjacent peripheral pot can be created and tool storage in the magazine can be flexibly managed.

Furthermore, when the setting value of the L value is set to a smaller value (for example, 40 mm) for a pot to which a spatial margin is to be given (for example, the size of the pot is 60 mm), a larger clearance can be provided. Since this makes it easy to visually check the side surface of the tool when the door of the magazine is opened to look therein, a pot at a position easily seen by the user can be set as an observation pot. With thus setting, a tool to be stored in the observation pot is limited to a small tool and a clearance is always provided between the tool and an adjacent tool. Alternatively, a method of setting a large setting value (for example, 110 mm) as the L value of the observation pot may be adopted. In this case, no tool can be stored in the peripheral pots adjacent to the observation pot and a tool that can be stored in the observation pot can be more easily observed.

In the magazine definition information of the first modification, cells of the pot number, the upper pot number, the lower pot number, the maximum tool length, the priority, the L0 value, the L1 value, the L2 value, the L3 value, and the L4 value are provided in the record of each pot. The pot number, the upper pot number, and the lower pot number are the same as those in the embodiment. A value "−1" in the upper pot number and the lower pot number corresponds to "none" in FIG. 4. The maximum tool length corresponds to "the upper limit of the length as the operation rule" explained in the embodiment. The priority indicates the levels of pots to be preferentially adopted. For example, when a tool can be stored in a pot A having the priority: 1 and a pot B having the priority: 4, the tool may be stored in the pot A having a higher priority. The L0 value to the L4 value all relate to the length in the radius direction of a tool.

A unique value (for example, "−2") may be set to one or both of the upper pot number and the lower pot number of a pot that is prohibited on the use, to provide the function of ON of the use prohibition flag described above. When the pot that is prohibited on the use is a peripheral pot in the vicinity of a selected pot, it is preferable to determine whether a tool can be stored in the selected pot on the assumption that some tool is stored in the pot that is prohibited on the use. Alternatively, a unique value (for example, "−1") may be set in some or all of the cells of the L0 to L4 values to provide the function of ON of the use prohibition flag described above. On a tool management screen for selecting a pot from a tool pot list, a screen display unit may gray out a pot that is prohibited on the use to prevent the user from selecting the pot. For example, when FIG. 17B is displayed on the screen, a pot may be grayed out as that of a pot number 222 as illustrated in FIG. 17B. In this case, the L2 value being the largest setting value is set, and a state in which a tool cannot be stored also in pots of a pot number 221 and a pot number 223 may be set.

An example relating to setting of the setting values from the L0 value to the L4 value is explained with reference to FIG. 18.

Figure 18:
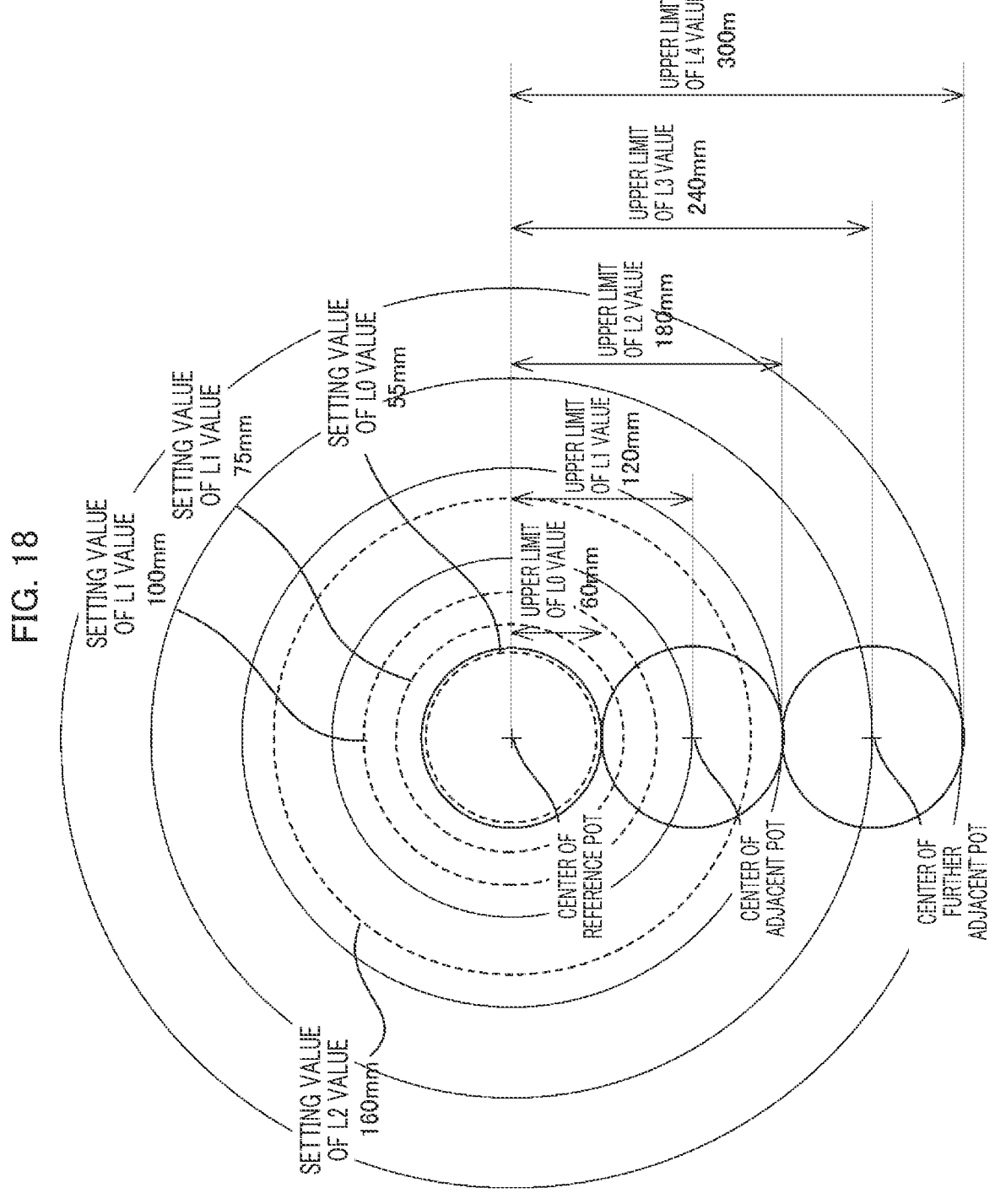
FIG. 18 is a diagram for explaining setting values from an L0 value to an L4 value.

FIG. 18 illustrates values that can be set as the L0 value to the L4 value associated with a reference pot. The upper limit of the L0 value is a half of the distance (pitch) between the center of the reference pot and the center of an adjacent pot. When the pitch is 120 mm, the upper limit of the L0 value is 60 mm. In the examples illustrated in FIGS. 17A and 17B, a value of 55 mm is set in the cell of the L0 value of each pot. This means that tools where the setting value of the length in the radial direction of a tool is equal to or less than 55 mm can be stored in each pot when the operation is performed using the magazine definition information.

In the case of the pot number 1 in FIG. 17A, a specific value is set only in the cell of the L0 value while 0 (zero) mm is set in the cells of the L1 value to the L4 value and no tool cannot be stored therein. When the L0 value is selected for the pot number 1, the determining unit 546 determines that tools in which the length in the radial direction of the tool is equal to or less than 55 mm can be stored therein aside from determining the relation between the peripheral pots.

The condition of the L1 value is the distance (pitch) between the center of the reference pot and the center of the adjacent pot, and the upper limit of the L1 value is 120 mm when the pitch is 120 mm. That is, a value up to 120 mm can be set in the cell of the L1 value.

The L2 value is set to 1.5 times as large as the distance (pitch) between the center of the reference pot and the center of the adjacent pot. When the pitch is 120 mm, the upper limit of the L2 value is 180 mm.

In the examples illustrated in FIGS. 17A and 17B, there are a case in which 0 (zero) mm is set in the cell of the L2 value as in the pot of "the pot number: 1" and a case in which 160 mm is set in the cell of the L2 value as in the pot of "the pot number: 214". When the L2 value is selected, the pot of "the pot number: 1" cannot store a tool having the tool diameter larger than zero mm and practically no tool can be stored therein. In the case of the pot of "the pot number: 214", when the L2 value is selected, a tool having a tool size that is contained inside a circle having a radius equal to or less than 160 mm can be stored therein aside from the relation with peripheral pots. In the first modification, a sectional shape containing the tool radius of a tool is compared with the circle. For example, even when a tool has a trapezoidal sectional shape, this tool can be stored in the pot when the sectional shape is all contained inside a circle having the setting value set in the cell of the L2 value as the radius.

Similarly, the L3 value is set to twice as large as the distance (pitch) between the center of the reference pot and the center of the adjacent pot, and the L4 value is set to 2.5 times as large as the distance (pitch) between the center of the reference pot and the center of the adjacent pot.

Figure 19:
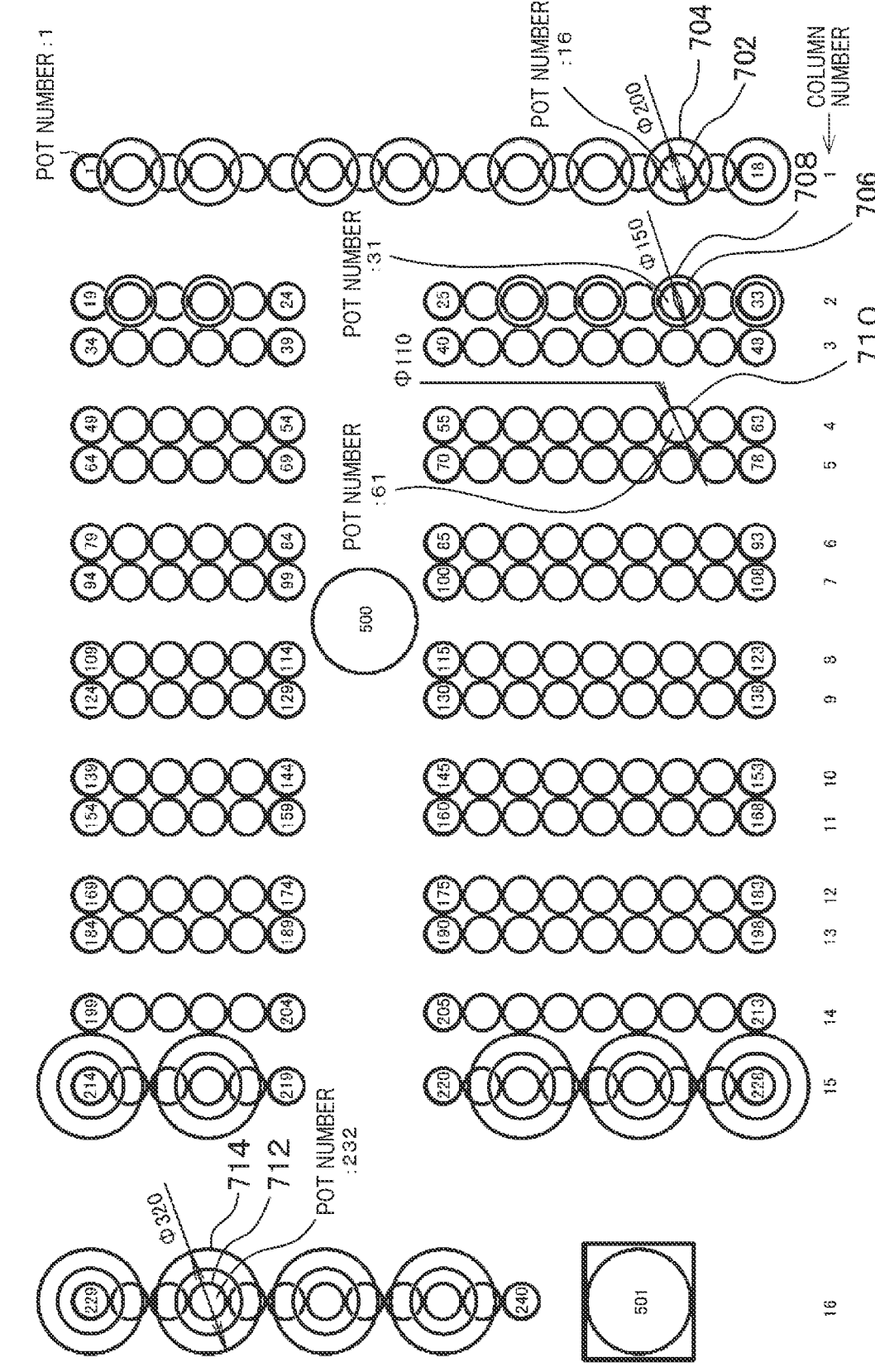
FIG. 19 is a tool interference diagram in the first modification.

FIG. 19 is a tool interference diagram in the first modification. This tool interference diagram illustrates setting values in the cells of the L0 value to the L4 value in the magazine definition information illustrated in FIGS. 17A and 17B in a diagram.

This example represents a rack magazine in which pots are arranged in 16 columns including a first column, a second column, a third column, . . . , and a sixteenth column from the right.

The first column of pots is explained with reference to FIG. 17A. The numbers of the pots arranged from the upper side to the lower side in the first column are 1, 2, . . . , and 18 in this order. Illustrated circles are drawn to be aligned with center positions of the respective pots. The radii of small circles in the first column correspond to 55 mm, which is the setting value of the L0 value. The radii of large circles in the first column correspond to 100 mm, which is the setting value of the L1 value.

FIG. 17A also provides information of some pots in the second column. In FIG. 19, the numbers of pots arranged from the upper side to the lower side in the second column are 19, 20, . . . , and 33 in this order. Small circles are the same as those in the first column. The radii of a little larger circles in the second column correspond to 75 mm, which is the setting value of the L1 value. In this way, while the setting values that are set in the cells of the L0 value for "the pot number: 2" and "the pot number: 20" are 55 and are the same, the setting values set in the cells of the L1 value are 100 and 75 and are different. As described above, the setting values can be flexibly set according to the structure of the magazine in the first modification.

The fifteenth and sixteenth columns of pots are explained with reference to FIG. 17B. The numbers of the pots arranged from the upper side to the lower side in the fifteenth column are 214, 215, . . . , and 228 in this order. The numbers of the pots arranged from the upper side to the lower side in the sixteenth column are 229, 230, . . . , and 240 in this order. Small circles that are the same as those in the first column correspond to 55 mm, which is the setting value of the L0 value. Second smallest circles correspond to 100 mm, which is the setting value of the L1 value. Largest circles correspond to 160 mm, which is the setting value of the L2 value.

Conventionally, the user visually checks a plate of the tool interference diagram attached next to a machine tool and determines a pot that can accommodate a tool according to the length of the tool in the radial direction. However, if the user makes an error in the determination, a defect such as interference of the stored tool with an adjacent tool may occur. In the first modification, to prevent such a defect, whether a tool designated in the process of S34 in FIG. 10 can be stored in a pot selected in the process of S32 in FIG. 10 is automatically determined.

Furthermore, when another tool is to be added later, it is conventionally difficult to perform an adjustment of a pot that can accommodate the tool, including other tools. However, when the length can be set for each pot using these cells, the determination can be easily performed by information processing.

A tool selected in the process of S34 in FIG. 10 is hereinafter referred to also as "selected tool". A pot selected in the process of S32 in FIG. 10 is referred to also as "selected pot".

Figure 20:
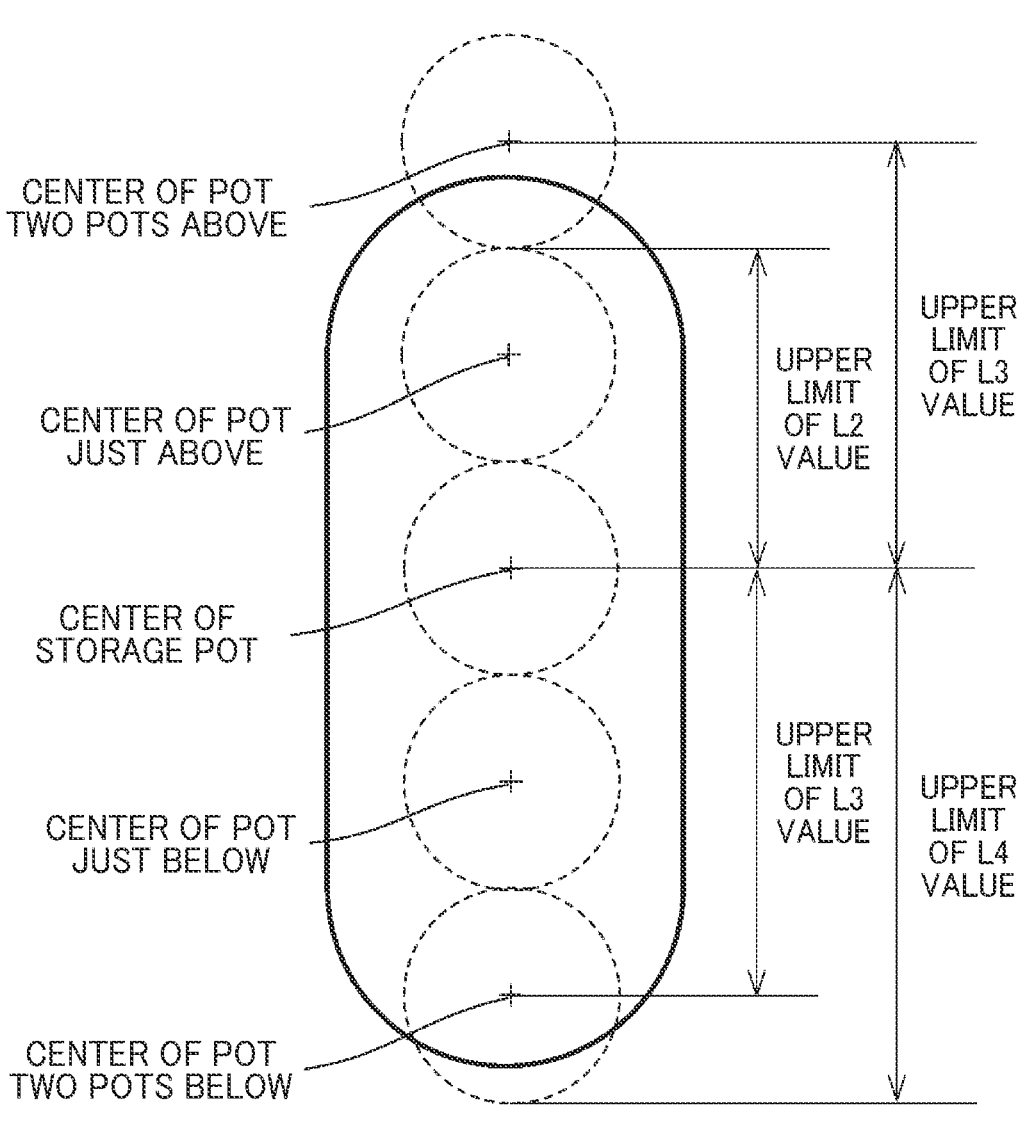
FIG. 20 is a front view of one example of a tool of the L4 value type.

FIG. 20 is a front view of one example of a tool to be stored in the magazine.

In recent years, large-diameter tools where the shape seen from the front in the axis direction of the tool (or the direction of insertion of the tool into a pot) is not a true circle but an elongated shape such as an oval, an elongated circle, or an ellipse as illustrated in FIG. 20 are used in some cases. Tools having an asymmetric shape are used in other cases. In this example, since the length in the longitudinal direction from the center of a pot is asymmetric, the longer length is used as a reference, which is a length between the upper limit of the L3 value and the upper limit of the L4 value in the first modification. When such a tool is to be used, a setting value equal to or lower than the upper limit of the L4 value needs to be set in the cell of the L4 value of a pot which is allowed to store the tool of the L4 value type. Similarly, when a tool having the length from the center of a pot in the longitudinal direction between the upper limit of the L2 value and the upper limit of the L3 value in the first modification is to be stored, a setting value equal to or lower than the upper limit of the L3 value needs to be set in the cell of the L3 value.

FIG. 21 is a diagram illustrating an example of a tool information input screen and a data structure of the tool information.

The user can input the maximum diameter, the tool length, and the like. In S10 of FIG. 8, the tool information input unit 522 accepts the input maximum diameter, tool length, and the like. The tool information update unit 542 stores the accepted maximum diameter, tool length, and the like in the record of the tool information (FIG. 21) to be associated with the tool number. The maximum diameter is an example of the size of each of tools that can be attached to the machine tool. In this example of the tool information input screen, when a sectional shape in the radial direction of a tool of the tool number T001 is a square, the square is contained inside a circle having the diagonal line of 100 mm as the diameter. Accordingly, 100 mm is input in the field of the maximum diameter of the tool number T001. The tool length is determined with referring to the magazine definition information illustrated in FIGS. 17A and 17B. The user may further input an L value to be applied to the tool. In such a case, the information input unit 522 accepts a value (any of "0" to "4") indicating a type of the L value and stores the accepted value indicating the type of the L value in the record of the tool information. For example, the user sometimes selects a larger L value for a special tool. This enables flexible setting to provide a spatial margin according to the shape of a tool or the movement trajectory as well as the maximum diameter. In such a case, the user can intentionally set a value indicating a type of the L value larger than the L value suitable for the maximum value of the tool.

That is, the user can select a desired type of the L value for each tool without determining a type of the L value only on the basis of the size of a tool. When this tool is to be stored as a selected tool in a selected pot, the setting value of the L value set for the pot is loaded in the tool information to be used in the determination of the storage possibility. For example, when a larger type of the L value is set for a tool that is valuable or expensive and that should not be hit under any circumstances, a margin space can be provided around the tool and interference can be more reliably prevented.

However, a value indicating a type of the L value is not necessarily input. When this value is not input, a type of the L value suitable for the maximum diameter of the tool is automatically set after a selected pot is designated. For example, for a general tool that does not require a margin space, automatic setting of a type of the L value suffices without designation of a type of the L value by the user.

As indicated by a first record of the tool information in a lower part of FIG. 21, the L value is not set at a stage when an input has been accepted on the tool information input screen. The L value is determined after a selected pot to which a tool is to be stored is designated.

In the case of a tool of "the tool number: T002" indicated by a second record, the maximum diameter is 100 mm and therefore the length of the tool in the radial direction from the center of a pot is 50 mm when the tool is symmetric. When "the pot number: 2" illustrated in FIG. 17A is selected to store the tool in the selected pot (the pot number: 2), the L0 value being the setting value of 55 mm is set because the length of the tool in the radial direction is 50 mm.

In the case of a tool of "the tool number: T003" indicated by a third record, the maximum diameter is 180 mm and accordingly the length of the tool in the radial direction from the center of a pot is 90 mm when the tool is symmetric. When "the pot number: 4" illustrated in FIG. 17A is selected to store the tool in the selected pot (the pot number: 4), the L1 value being the setting value of 100 mm is set because the length of the tool in the radial direction is 90 mm.

Figure 22:
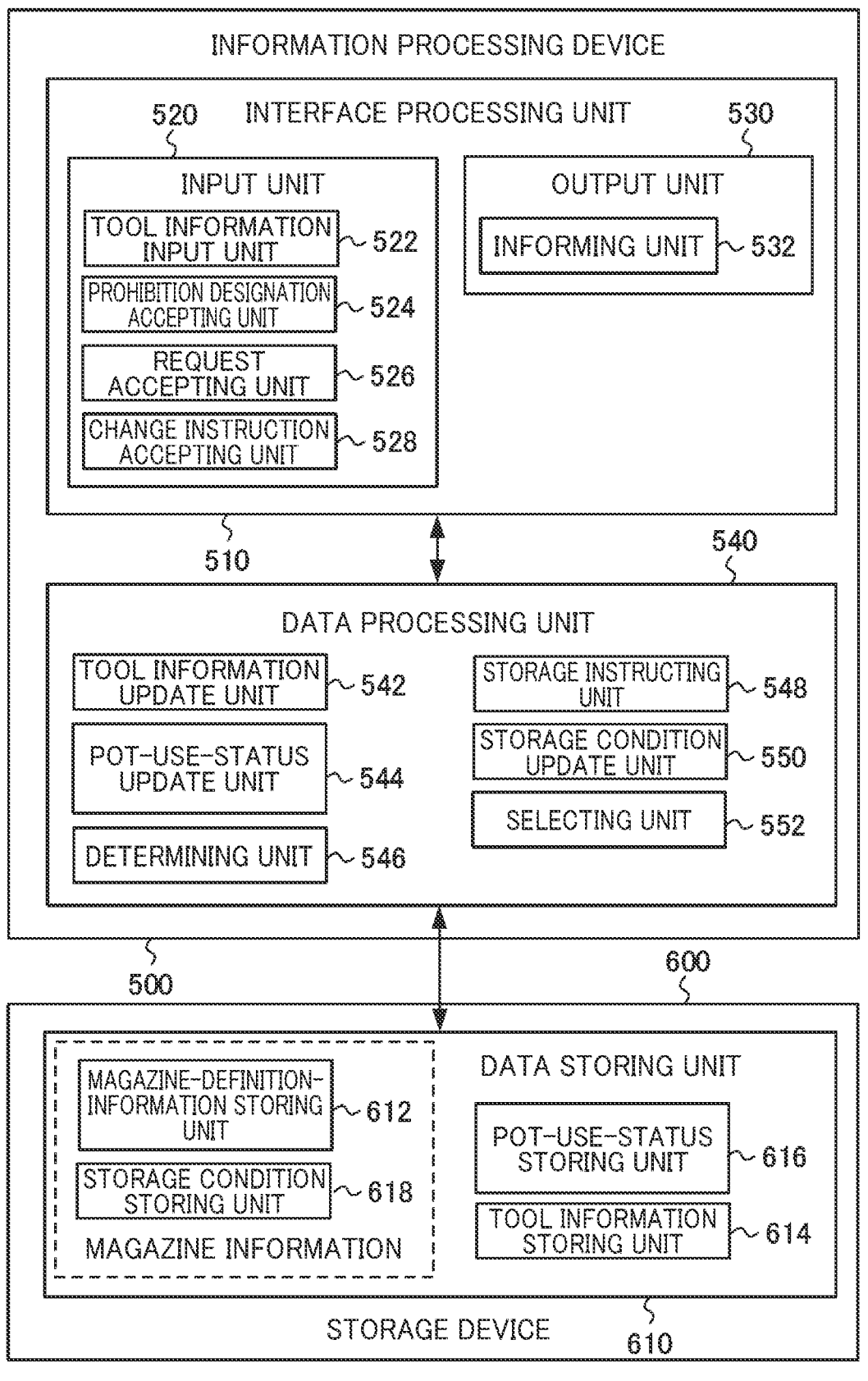
FIG. 22 is a functional block diagram of an information processing system according to the first modification.

FIG. 22 is a functional block diagram of the information processing system according to the first modification.

The data processing unit 540 of the information processing device 500 in the first modification has a selecting unit 552. When an L value is set in the tool information by an operation of the user, the selecting unit 552 selects a cell corresponding to the L value set in the tool information from the cells of the L0 value to the L4 value of a designated pot and acquires the setting value from the cell.

The data storing unit 610 of the information processing device 500 in the first modification has a storage condition storing unit 618. The storage condition storing unit 618 stores storage condition data to be applied to each of pots for accommodating tools in the magazine. Information stored in the magazine-definition-information storing unit 612 and stored in the storage condition storing unit 618 corresponds to the magazine information.

Processes of the tool storage illustrated in FIG. 10 are the same as those in the embodiment.

When an L value is set in the tool information by an operation of the user, the selecting unit 552 selects a cell corresponding to the L value set in the tool information from the cells of the L0 value to the L4 value of the designated selected pot and acquires the setting value from the cell. For example, in a case in which "the pot number: 1" in FIG. 17A is designated as the selected pot and the L value of a selected tool is set to "1" (the L1 value), the determining unit 546 determines that the tool storage is impossible because the L1 value of "the pot number: 1" is zero mm. For example, in a case in which "the pot number: 1" is the selected pot and the L value of a selected tool is set to "0 (zero)" (the L0 value), the determining unit 546 determines that the tool storage is impossible when the maximum diameter of the tool in the tool information is 106 mm. This is because the maximum diameter/2=58 mm is large than 55 mm as the setting value.

When an L value is not set in the tool information, the determining unit 546 may automatically set an L value suitable for the maximum diameter of the relevant tool in the tool information. Specifically, when a half of the maximum diameter in the tool information is equal to or smaller than the setting value in the cell of the L0 value of the selected pot to which the tool is to be stored, the determining unit 546 sets "0" as the L value. When a half of the maximum diameter in the tool information is larger than the setting value in the cell of the L0 value of the selected pot to which the tool is to be stored and is equal to or smaller than the setting value in the cell of the L1 value, the determining unit 546 sets "1" as the L value. The determining unit 546 can set "2", "3", or "4" as the L value in the same manner.

The determining unit 546 performs a determining process of rack interference. When the upper pot number or the lower pot number is −1 in the magazine definition information (FIG. 17), the determining unit 546 determines that the pot is located at a rack end. Since there is no adjacent pot, the determining unit 546 may perform a process in which no determination on the tool interference with an adjacent pot (one of peripheral pots) is performed. Accordingly, when a determination on whether there is an adjacent pot is performed before a tool interference determination of the selected pot, the determining process time can be shortened.

Subsequently, the determining unit 546 performs a determining process of tool interference. When the L value of the selected tool is "0", the interference determining process of a tool is performed using the L0 value set for the selected pot.

FIG. 23 is a data structure diagram of the storage condition data of pots relating to a tool of the L0 value type.

The determining unit 546 determines whether a tool of the L0 value type can be stored in a selected pot that is selected to store the tool with referring to the storage conditions in FIG. 23. A tool of the L0 value type is a tool for which "0" is set as the L value in the tool information. Tools of the L1 value type to the L4 value type are also defined by the L value in the tool information. The storage condition data includes a plurality of subconditions. One record corresponds to one subcondition. In this example, 12 subconditions are included. Contents of the subconditions are an AND condition of four items including the L value of the selected tool, a peripheral pot, whether there is a stored tool in the peripheral pot, and the L value of the stored tool. Since the selected tool to be stored is of the L0 value type, the L values of the selected tool are all "0". The peripheral pot indicates a pot around the selected pot in which the tool is to be stored. The peripheral pot is specified by a relative position relation (for example, "just above" or "just below") with the selected pot. Specifically, the determining unit 546 specifies the peripheral pot with referring to the magazine-definition-information storing unit 612. A case in which no tool is stored in the peripheral pot is indicated by an L value "−" of the stored tool. The stored tool is a tool stored in the peripheral pot. The determining unit 546 can specify whether there is a stored tool with referring to the pot-use-status storing unit 616. When a tool is stored in the peripheral pot, the type of the L value is used as the condition of determinations. The determining unit 546 specifies the stored tool with referring to the pot-use-status storing unit 616 and can refer to the L value from the tool information of the stored tool. The determination result of the subconditions is obtained when all the four items described above are met. The determination result as a subcondition is an item provided for explanatory convenience and is not always required in the processes. When all the four items described above are met, the processes proceed to a determination of a subcondition that is set in the next determination item. When the next determination item indicates "end", the final determination result of the interference determining process of the tool of the L0 value type in this record is obtained and the interference determining process of the tool of the L0 value type is ended. When at least one of the four items described above is not met, the processes proceed to a determination of the subcondition of the next record.

Figure 24:
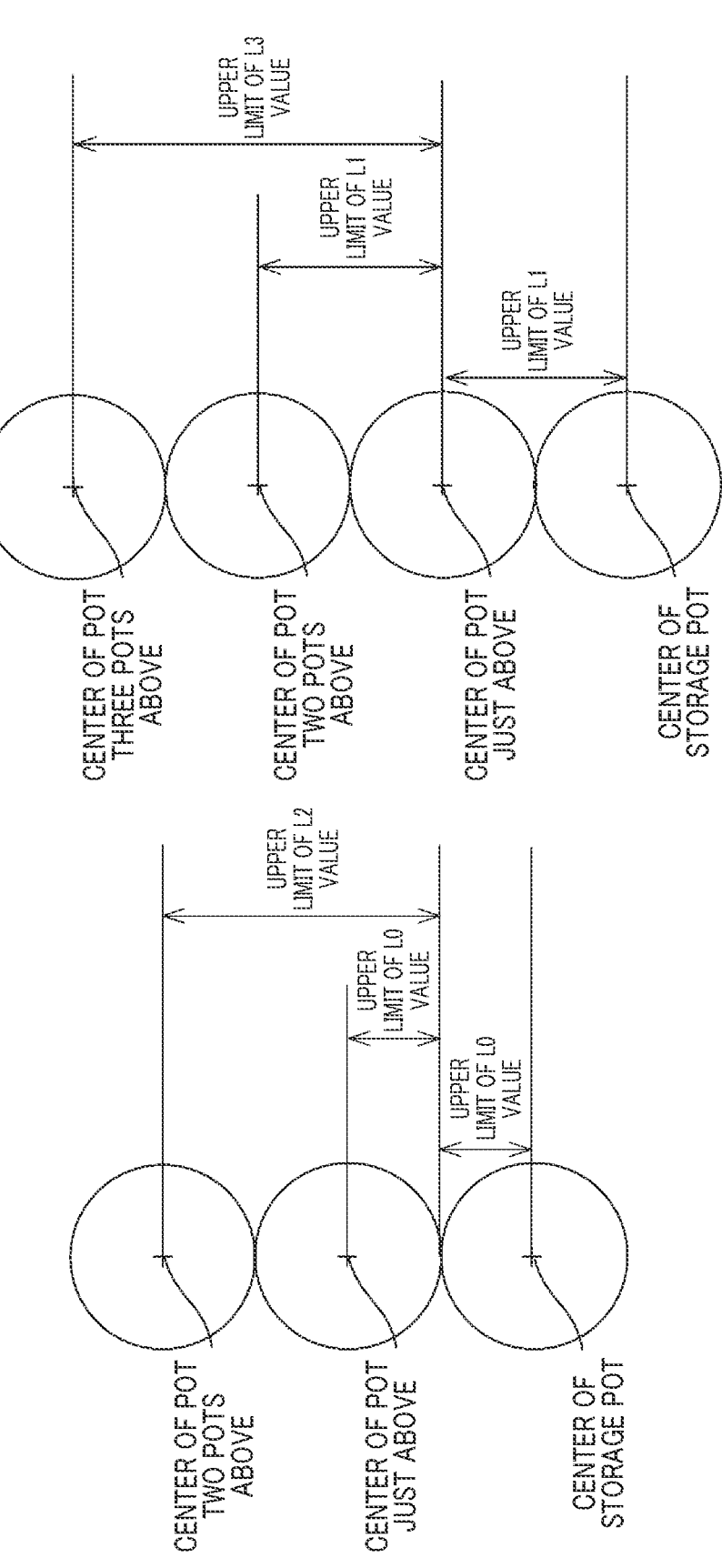
FIG. 24 is a diagram illustrating an outline of storage conditions of pots relating to a tool of the L0 value type and a tool of the L1 value type.

An outline of storage conditions of pots relating to a tool of the L0 value type is illustrated in a left part of FIG. 24.

The determining unit 546 determines whether a selected tool can be stored on the basis of whether there is a possibility of overlapping of an area with each type of a tool stored in peripheral pots around a selected pot assuming that the selected tool is stored in the selected pot. While FIG. 24 illustrates only peripheral pots on the upper side, the same holds for peripheral pots on the lower side. The determining unit 546 in the present modification performs a determining process of the peripheral pots on the lower side after performing the determining process of the peripheral pots on the upper side.

When no tool is stored in a pot just above, there is no problem regarding the pot just above. This determination corresponds to a subcondition L0–1A in FIG. 23. In this case, the processes proceed to a determination (a subcondition L0–2A) on a pot two pots above. When a tool of the L0 value type is stored in the pot just above, the areas do not overlap with each other and no interference occurs. This means that there is no problem regarding pots on the upper side and the processes proceed to a determination on the lower side. This determination corresponds to a subcondition L0–1B in FIG. 23.

When a tool of any of the L1 value type to the L4 value type is stored in the pot just above, the areas overlap with each other and interference occurs or may occur. Therefore, it is determined that the storage is impossible and the interference determining process of the tool of the L0 value type is ended. This determination corresponds to a subcondition L0–1C in FIG. 23.

When no tool is stored in the pot two pots above in the subcondition L0–2A, there is no problem regarding the pots on the upper side and the processes proceed to a determination on the relation with the pots on the lower side. When a tool of any of the L0 value type to the L2 value type is stored in the pot two pots above, the areas do not overlap with each other and no interference occurs. In this case, there is no problem regarding the pots on the upper side and the processes proceed to the determination on the relation with the pots on the lower side. This determination corresponds to a subcondition L0–2B in FIG. 23.

When a tool of the L3 value type or the L4 value type is stored in the pot two pots above, the areas overlap with each other and interference between tools occurs or may occur. Therefore, it is determined that the storage is impossible and the interference determining process of the tool of the L0 value type is ended. This determination corresponds to a subcondition L0–2C in FIG. 23.

When there is no corresponding pot on the upper side, such as in a case in which a pot near the rack is designated, the processes relating to the pots on the upper side are ended and the processes proceed to the processes relating to the pots on the lower side.

It is assumed that there is no problem on the upper side and the processes have proceeded to a determination of a pot just below. When no tool is stored in the pot just below, there is no problem regarding the pot just below. This determination corresponds to a subcondition L0+1A in FIG. 23. In this case, the processes proceed to a determination on a pot two pots below.

When a tool of the L0 value type is stored in the pot just below, the areas do not overlap with each other and no interference occurs. This means that there is no problem also on the lower side, so that it is determined that the storage is possible and the interference determining process of the tool of the L0 value type is ended. This determination corresponds to a subcondition L0+1B in FIG. 23.

When a tool of any of the L1 value type to L4 value type is stored in the pot just below, the areas overlap with each other and interference occurs or may occur. Therefore, it is determined that the storage is impossible and the interference determining process of the tool of the L0 value type is ended. This determination corresponds to a subcondition L0+1C in FIG. 23.

It is assumed that there is no problem regarding the pot just below and the processes have proceeded to a determination on a pot two pots below. When no tool is stored in the pot two pots below, this means that there is no problem also on the lower side, so that it is determined that the storage is possible and the interference determining process of the tool of the L0 value type is ended. This determination corresponds to a subcondition L0+2A in FIG. 23.

When a tool of any of the L0 value type to the L2 value type is stored in the pot two pots below, the areas do not overlap with each other and no interference occurs. This means that there is no problem also on the lower side, so that it is determined that the storage is possible and the interference determining process of the tool of the L0 value type is ended. This determination corresponds to a subcondition L0+2B in FIG. 23.

When a tool of the L3 value type or the L4 value type is stored in the pot two pots below, the areas overlap with each other and interference occurs or may occur. Therefore, it is determined that the storage is impossible and the interference determining process of the tool of the L0 value type is ended. This determination corresponds to a subcondition L0+2C in FIG. 23.

When there is no corresponding pot on the lower side, such as in a case in which a pot near the rack is designated, the processes relating to the pots on the lower side are ended, it is determined that the storage is possible, and then the interference determining process of the tool of the L0 value type is ended.

When the L value of the selected tool to be stored is "1" (the L1 value type), the interference determining process on a tool of the L1 value type is performed. An outline of storage conditions of pots relating to a tool of the L1 value type is illustrated in a right part of FIG. 24.

FIG. 25 is a data structure diagram of storage condition data of pots relating to a tool of the L1 value type. The procedure of processes performed by the determining unit 546 is the same as that in the case illustrated in FIG. 23.

When the L value of a selected tool to be stored is "2" (the L2 value type), the interference determining process on a tool of the L2 value type is performed.

FIG. 26 is a data structure diagram of storage condition data of pots relating to a tool of the L2 value type. The procedure of processes performed by the determining unit 546 is the same as that in the case illustrated in FIG. 23.

FIG. 27 is a data structure diagram of storage condition data of pots relating to a tool of the L3 value type. The procedure of processes performed by the determining unit 546 is the same as that in the case illustrated in FIG. 23.

When the L value of a selected tool to be stored is "4" (the L4 value type), the interference determining process on a tool of the L4 value type is performed.

FIG. 28 is a data structure diagram of storage condition data of pots relating to a tool of the L4 value type. The procedure of processes performed by the determining unit 546 is the same as that in the case illustrated in FIG. 23.

As explained with reference to FIG. 10, when it is not determined that the storage is impossible (Y in S38), the processes proceed to a process of the tool storage operation of S40. When it is determined that the storage is impossible (N in S38), the processes proceed to the informing process of S44.

As described above, in the first modification, a setting value is set to each of a plurality of tool types relating to the length of a tool in the radial direction, and whether storage is possible can be determined in various determinations on storage of a tool in a pot according to combinations of the magnitude relation in the size, the positional relation of pots, and the tool types.

Alternatively, some of L values may be set to a common setting value to the pots and the other L values may be set to setting values differing in some pots. As one mode, a common setting value to the pots is used as each of the L0 value and the L1 value, and setting values differing according to the pots are set to each of the L2 value, the L3 value, and the L4 value. For example, the L0 value can be set to 55, the L1 value can be set to 100, the L2 values of the pot numbers 1 to 10 can be set to 160, and the L2 values of the pot numbers 11 to 20 can be set to 300. Such setting provides a tool determination that enables flexible storage also in a magazine in which the positions of tools that can be stored are structurally decided by the attributes of the tools.

In FIG. 17A, the pot numbers 1, 2, 19, and 20 have a common value of 55 as the L0 values while having different values of 0, 100, 0, and 75 set as the L1 values, respectively. Such setting is performed because the mechanical structures in the magazine are different.

Furthermore, for example, the L0 value can be set to 55, the L1 value can be set to 100, the L2 value can be set to 160, and the L3 value can be set to 300 for the pot number 1, 200 for the pot number 40, and 0 (zero) for the remaining pots. In this case, storage of a special tool in the pot number 1 or the pot number 40 can be individually set. Also in this case, a determination on storage of a tool for which the position to be stored is previously decided due to the structure of the magazine can be performed.

In the information processing system, the same setting value can be set to the first cell (for example, the L1 value) of the first pot and the fifth cell (for example, the L1 value) of the second pot among the cells, and different setting values can be set to the fourth cell (for example, the L3 value) of the first pot and the eighth cell (for example, the L3 value) of the second pot, respectively.

Second Modification

In a second modification, the upper limit is not set for the setting values of the L value. No restriction is placed on the magnitude relation among the setting values of the L value.

Since it is presupposed that the upper limit is set for the setting value of each L value in the first modification, overlapping of the areas of tools can be determined according to combinations of the L value types. However, since the upper limit is not set for the setting value of each L value in the second modification, overlapping of the areas of tools cannot be determined according to combinations of the L value types. In the second modification, overlapping of the areas of tools is determined on the basis of the setting value of the L value and the distance (pitch) between the centers of pots.

In the second modification, the setting value of the L value set in the magazine definition information is used instead of the maximum diameter of each tool. The maximum diameter of each tool used in the embodiment is a value unique to the tool while the setting value of the L value to be used in the second modification is not a value unique to the tool. The user can freely simulate ways to use of each pot and set any setting value as each L value of each pot. That is, the setting value of the L value is a value that can be freely set by the user.

A point of the second modification different from the first modification is mainly explained based on the first modification. The data structure of the magazine definition information is the same as that in the first modification (FIG. 17). Also in the second modification, the maximum diameter, the length, and the L value are accepted on the tool information input screen (FIG. 21) to be included in the tool information (FIG. 21), similarly in the first modification.

As for the functional blocks of the information processing system, the information processing device 500 includes the selecting unit 552 similarly in FIG. 22 of the first modification. However, the storage condition storing unit 618 of the storage device 600 used in the first modification may be omitted. As will be described later, the storage possibility determining process is performed in accordance with a predetermined process flow (FIG. 29) without using the storage condition illustrated in FIG. 23 and other figures in the first modification. Particularly, the second modification is different from the first modification in using the setting value of the L value included in the magazine definition information in processes of S116 and S126 in FIG. 29. In the second modification, the setting value of each L value included in the magazine definition information instead of the storage condition (FIG. 23 and other figures) stored in the storage condition storing unit 618 corresponds to the storage condition of each pot for storing a tool in the magazine.

The flow of the processes of tool storage illustrated in FIG. 10 is the same as that in the embodiment and the first modification. The determining process of tool interference is different from that in the first modification.

Figure 29:
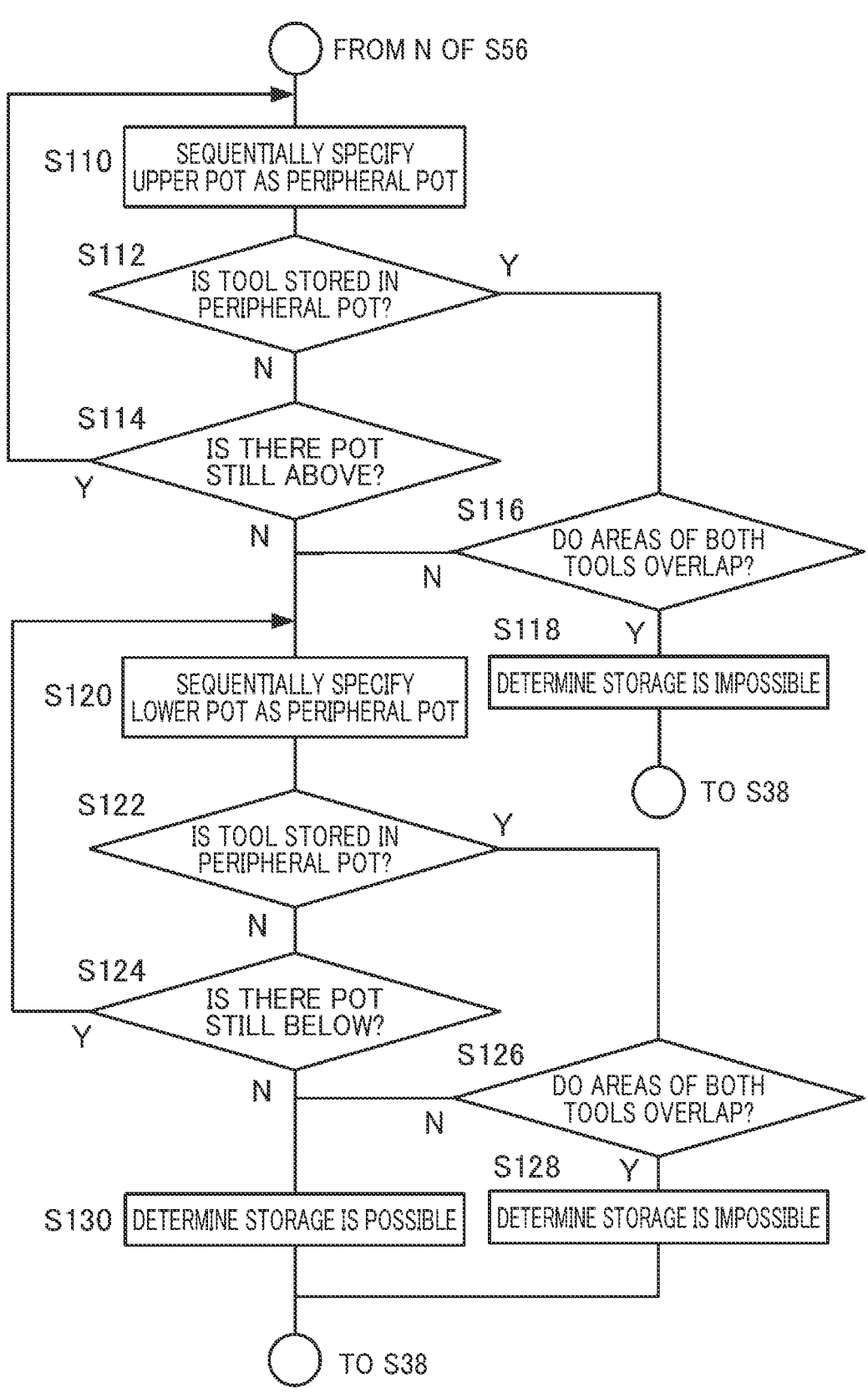
FIG. 29 is a flowchart illustrating determining processes of tool interference in a second modification.

FIG. 29 is a flowchart illustrating determining processes of tool interference in the rack magazine in the second modification. This flow follows N of S56 in FIG. 11.

The determining unit 546 first searches for a peripheral pot storing a tool on the upper side of a selected pot from the nearest one. Accordingly, the determining unit 546 sequentially specifies an upper pot as a peripheral pot with referring to the magazine-definition-information storing unit 612 (S110). A pot just above the selected pot is first specified. The determining unit 546 determines whether a tool is stored in the peripheral pot with referring to the pot-use-status storing unit 616 (S112). When determining that no tool is stored in the peripheral pot (N in S112), the determining unit 546 further determines whether there is a pot above the peripheral pot (S114). When there is a pot above the peripheral pot (Y in S114), the processes return to S110 and the determining unit 546 specifies the pot located above as the next peripheral pot.

When a peripheral pot storing a tool is found (Y in S112), the determining unit 546 determines whether the area of the stored tool in the peripheral pot and the area of the selected tool overlap with each other (S116). The determining unit 546 may perform the determination using the maximum diameter of the selected tool and the maximum diameter of the stored tool in the peripheral pot. Alternatively, a setting value associated with the pot may be used instead of the maximum diameters of the tools. That is, the setting value set in the magazine definition information is used. This setting value is obtained from a cell of the L value in the magazine definition information by the selecting unit 552. While being a value indicating the length of the tool in the radial direction from the pot center, the setting value is not always the radius of the tool.

The determining unit 546 determines that the area of the selected tool and the area of the stored tool in the peripheral pot overlap with each other when the sum of the setting value set in the selected cell included in the tool information of the selected tool and the setting value set in the selected cell included in the tool information of the stored tool in the peripheral pot is equal to or more than the distance between the centers of the selected pot and the peripheral pot. Conversely, when the sum of the setting value included in the tool information of the selected tool and the setting value of the stored tool included in the tool information of the peripheral pot is less than the distance between the centers of the candidate pot and the peripheral pot, the determining unit 546 determines that the area of the stored tool and the area of the selected tool do not overlap with each other. The center of a pot is an example of the predetermined position. A predetermined position other than the center may be used as a reference. The distance between the centers of a candidate pot and a peripheral pot is defined by the pitch between the pot centers. For example, the distance between the centers of a selected pot and a peripheral pot just above is the pitch×1. The distance between a selected pot and a peripheral pot two pots above is the pitch×2.

When determining that the area of the selected tool and the area of the stored tool overlap with each other (Y in S116), the determining unit 546 determines that the selected tool cannot be stored in the candidate pot. The processes proceed to the process of S38 in FIG. 10 and the informing unit 532 informs that the storage is impossible in S44.

On the other hand, when it is determined that the area of the selected tool and the area of the stored tool do not overlap with each other (N in S116), the processes proceed to processes relating to the pots on the lower side starting from S120. When it is determined in the process of S114 that there is no pot above the peripheral pot (N in S114), that is, there is no tool to the upper end, the processes proceed to the processes relating to the pots on the lower side starting from S120. Whether the selected tool can be stored in the candidate pot or not has not been determined yet at that time.

Subsequently, the determining unit 546 searches for a pot storing a tool on the lower side of the selected pot from the nearest one. The determining unit 546 sequentially specifies a lower pot as a peripheral pot with referring to the magazine-definition-information storing unit 612 (S120) in the same manner as the processes for the upper side. A pot just below the candidate pot is first specified. The determining unit 546 determines whether a tool is stored therein with referring to the pot-use-status storing unit 616 (S122). When determining that no tool is stored in the peripheral pot (N in S122), the determining unit 546 further determines whether there is a pot below the peripheral pot (S124). When there is a pot below the peripheral pot, the processes return to S120 and the determining unit 546 specifies the pot below the peripheral pot as the next peripheral pot.

When a peripheral pot storing a tool is found (Y in S122), the determining unit 546 determines whether the area of the stored tool in the peripheral pot and the area of the selected tool overlap with each other (S126). The determining unit 546 determines that the area of the selected tool and the area of the stored tool overlap with each other when the sum of the setting value of the selected tool and the setting value of the stored tool in the peripheral pot is equal to or more than the distance between the centers of the candidate pot and the peripheral pot, similarly in S116. Conversely, when the sum of the setting value of the selected tool and the setting value of the stored tool in the peripheral pot is less than the distance between the centers of the candidate pot and the peripheral pot, the determining unit 546 determines that the area of the stored tool and the area of the selected tool do not overlap with each other.

When determining that the area of the selected tool and the area of the stored tool overlap with each other (Y in S126), the determining unit 546 determines that the selected tool cannot be stored in the candidate pot. The processes then proceed to the process of S38 in FIG. 10 and the informing unit 532 informs that the storage is impossible in S44.

On the other hand, upon determination that the area of the selected tool and the area of the storage tool do not overlap with each other (N in S126), it is determined that the selected tool can be stored in the candidate pot. The processes then proceed to the process of S38 in FIG. 10 to perform the tool storage operation indicated in S40. When it is determined in the process of S124 that there is no pot below the peripheral pot (N in S124), that is, also when there is no tool to the lower end, it is determined that the selected tool can be stored in the candidate pot. The processes similarly proceed to the process of S38 in FIG. 10 to perform the tool storage operation indicated in S40.

Examples 1 to 4 relating to the determination on tool interference in the second modification are described below.

Example 1A of Second Modification

Figure 30:
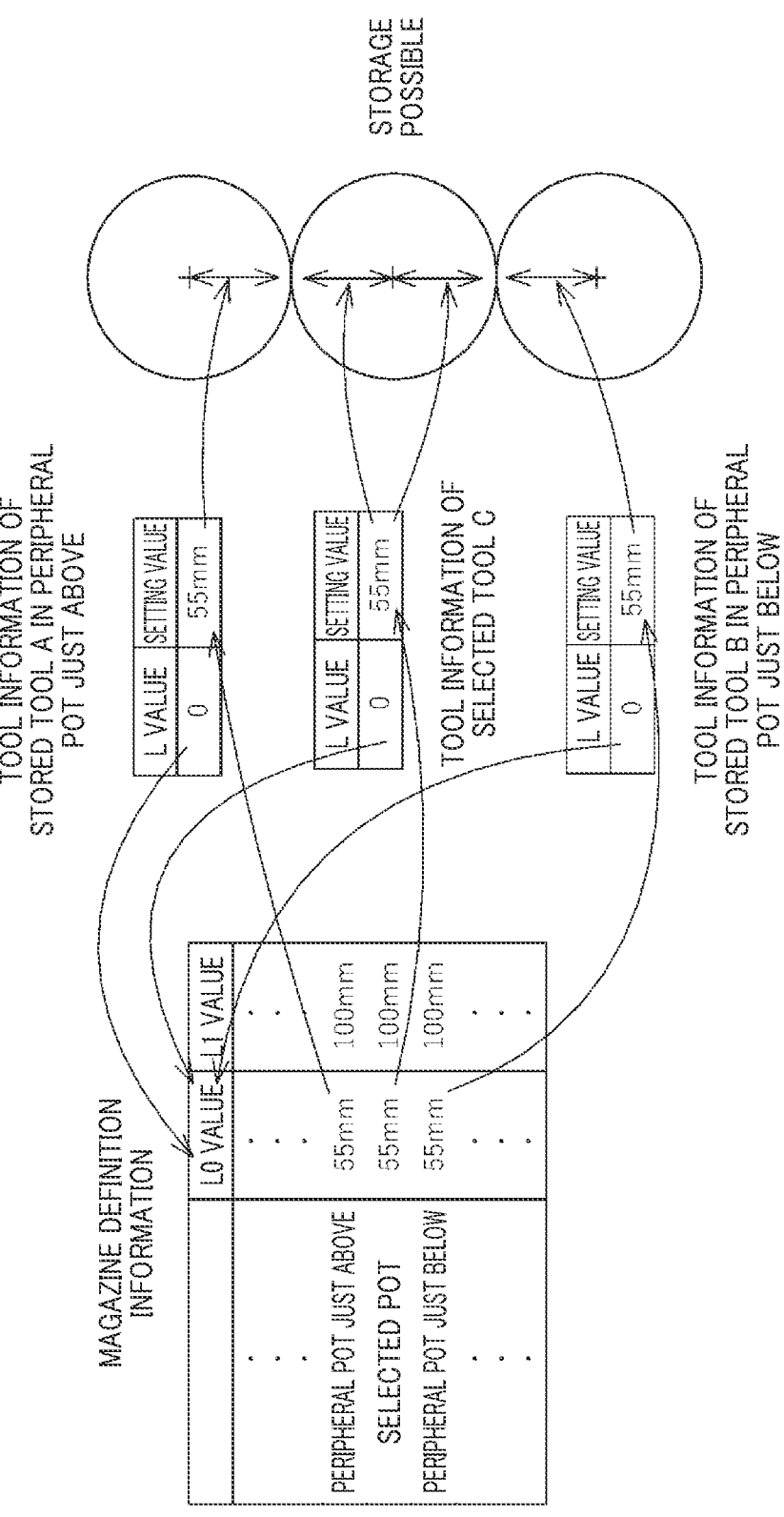
FIG. 30 is a diagram illustrating an outline of an example 1 of the second modification.

FIG. 30 is a diagram illustrating an outline of an example 1A of the second modification.

It is assumed in the example 1A that the setting value (55) of 55 mm is similarly set in the cell of the L0 value of each pot and the setting value (100) of 100 mm is similarly set in the cell of the L1 value of each pot. In this case, considering that a tool larger than 100 mm is not stored and that the pitch between the centers of pots is 120 mm, the area of a tool stored in a peripheral pot two pots above or a tool stored in a peripheral pot two pots below and the area of the selected tool to be stored in a selected pot never overlap with each other. Therefore, logically, the determination on overlapping of the areas between tools for a peripheral pot just above the selected pot and a peripheral pot just below the selected pot suffices. However, the determination on each peripheral pot may be repeatedly performed in practical processes while the peripheral pot is shifted to the upper end or the lower end as illustrated in FIG. 29.

FIG. 30 assumes that a tool A is stored in a peripheral pot just above. When the type of the L value in the tool information of the stored tool A is "0", the setting value: 55 mm of the L0 value of the peripheral pot just above is acquired. It is also assumed that a tool B is stored in a peripheral pot just below. When the type of the L value in the tool information of the stored tool B is "0", the setting value: 55 mm of the L0 value of the peripheral pot just below is acquired.

When the type of the L value in the tool information of a selected tool C is "0", the setting value: 55 mm of the L0 value of the selected pot is acquired. In the determination of S116 in FIG. 29, the sum: 110 mm of the setting value: 55 mm of the stored tool A and the setting value: 55 mm of the selected tool C is shorter than the pitch: 120 mm. Therefore, it is determined that the areas of the selected tool C and the stored tool A do not overlap with each other. Also in the determination of S126 in FIG. 29, it is similarly determined that the areas of the selected tool C and the stored tool B do not overlap with each other and the storage is finally determined in S130 to be possible.

Example 1B of Second Modification

An example 1B of the second modification is explained with reference to FIG. 30.

As illustrated in FIG. 30, the magazine-definition-information storing unit 612 has the L0 value of 55 and the L1 value of 100 stored therein for three pots including a selected pot, a peripheral pot just above that is adjacent to the selected pot, and a peripheral pot just below that is adjacent to the selected pot. In the magazine-definition-information storing unit 612, the cells of the L2 value, the L3 value, and the like of the selected pot and the like may be blank.

At the time of setup for storing tools in the magazine of the machine tool, 55 is selected as the L0 value for the selected pot, and 100 is selected as the L1 value for the peripheral pot just above that is adjacent to the selected pot and the peripheral pot just below that is adjacent to the selected pot. The user selects the selected pot and selects a tool to be stored in the selected pot. When the tool and the pot are selected, it is first determined whether the selected tool is equal to or less than the L0 value. When the maximum diameter of the tool is 100 mm, the comparison value is 50 and is equal to or less than the L0 value of 55. Accordingly, the determining unit 546 determines that the tool storage is OK in the comparison with the L value set for the selected pot. Subsequently, the determination on the relation with the peripheral pot just above is performed. The determining unit 546 determines whether there is a tool in the peripheral pot just above. When there is no tool, the determination on the relation with the peripheral pot just below is performed. When there is a tool in the peripheral pot just above, the determining unit 546 compares the L1 value set for the peripheral pot just above with the L0 value set for the selected pot. In this case, 100 as the L1 value set for the peripheral pot reaches the selected pot and it is therefore determined that the storage of the tool is impossible.

In the example 1B, the determination of the maximum diameter of the tool is applied only for the selected pot and other pots are determined on the basis of the L value set for each pot and information on whether a tool is stored therein. For example, even when the tool in the peripheral pot just above is a tool having the maximum diameter of 60 mm, the determining unit 546 performs the determination using the L value (100 in the example 1B) without using 30 (half of 60) in the determination of the selected pot and the peripheral pot just above.

Example 2 of Second Modification

Figure 31:
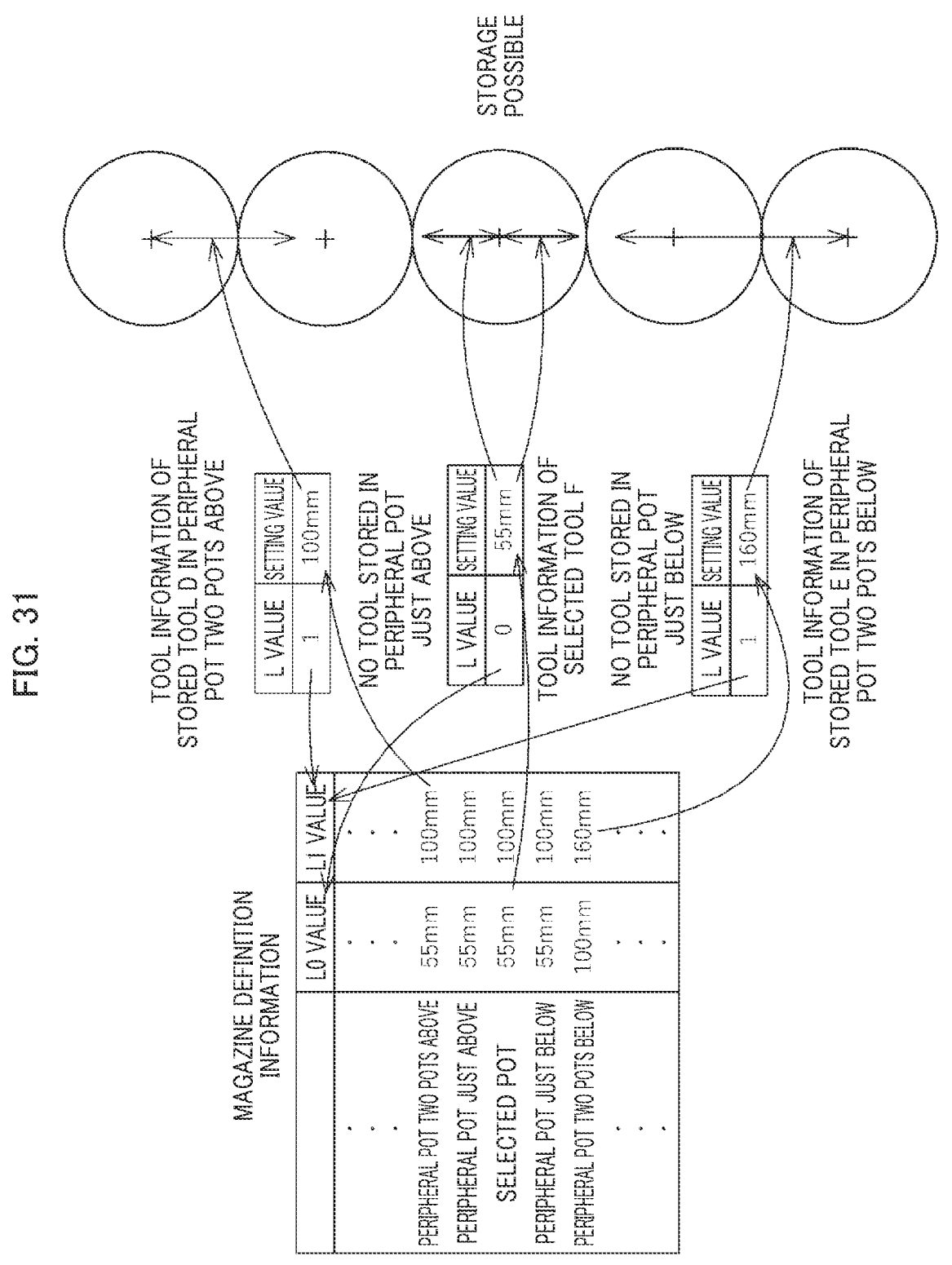
FIG. 31 is a diagram illustrating an outline of an example 2 of the second modification.

FIG. 31 is a diagram illustrating an outline of an example 2 of the second modification.

In the example 2, the setting values of the L0 value and the L1 value for the peripheral pot two pots below are different from those of other pots. Particularly, the setting value of the L1 value is 160 mm. When such a large value is set, overlapping of the areas of tools needs to be determined also for a peripheral pot two pots above a selected pot and a peripheral pot two pots below in addition to a peripheral pot just above and a peripheral pot just below. This is because there is a possibility that a large tool is stored therein.

FIG. 31 assumes that a tool D is stored in the peripheral pot two pots above. When the type of the L value in the tool information of the stored tool D is "1", the setting value: 100 mm of the L1 value of the peripheral pot two pots above is acquired. It is also assumed that a tool E is stored in the peripheral pot two pots below. When the type of the L value in the tool information of the stored tool E is "1", the setting value: 160 mm of the L0 value of the peripheral pot two pots below is acquired.

When the type of the L value in the tool information of a selected tool F is "0", the setting value: 55 mm of the L0 value of the selected pot is acquired. In the determination of S116 in FIG. 29, the sum: 155 mm of the setting value: 100 mm of the stored tool D and the setting value: 55 mm of the selected tool F is shorter than the pitch×2: 240 mm. Therefore, it is determined that the areas of the selected tool F and the stored tool D do not overlap with each other. Also in the determination of S126 of FIG. 29, it is similarly determined that the areas of the selected tool F and the stored tool E do not overlap with each other and the storage is finally determined in S130 to be possible.

Example 3 of Second Modification

Figure 32:
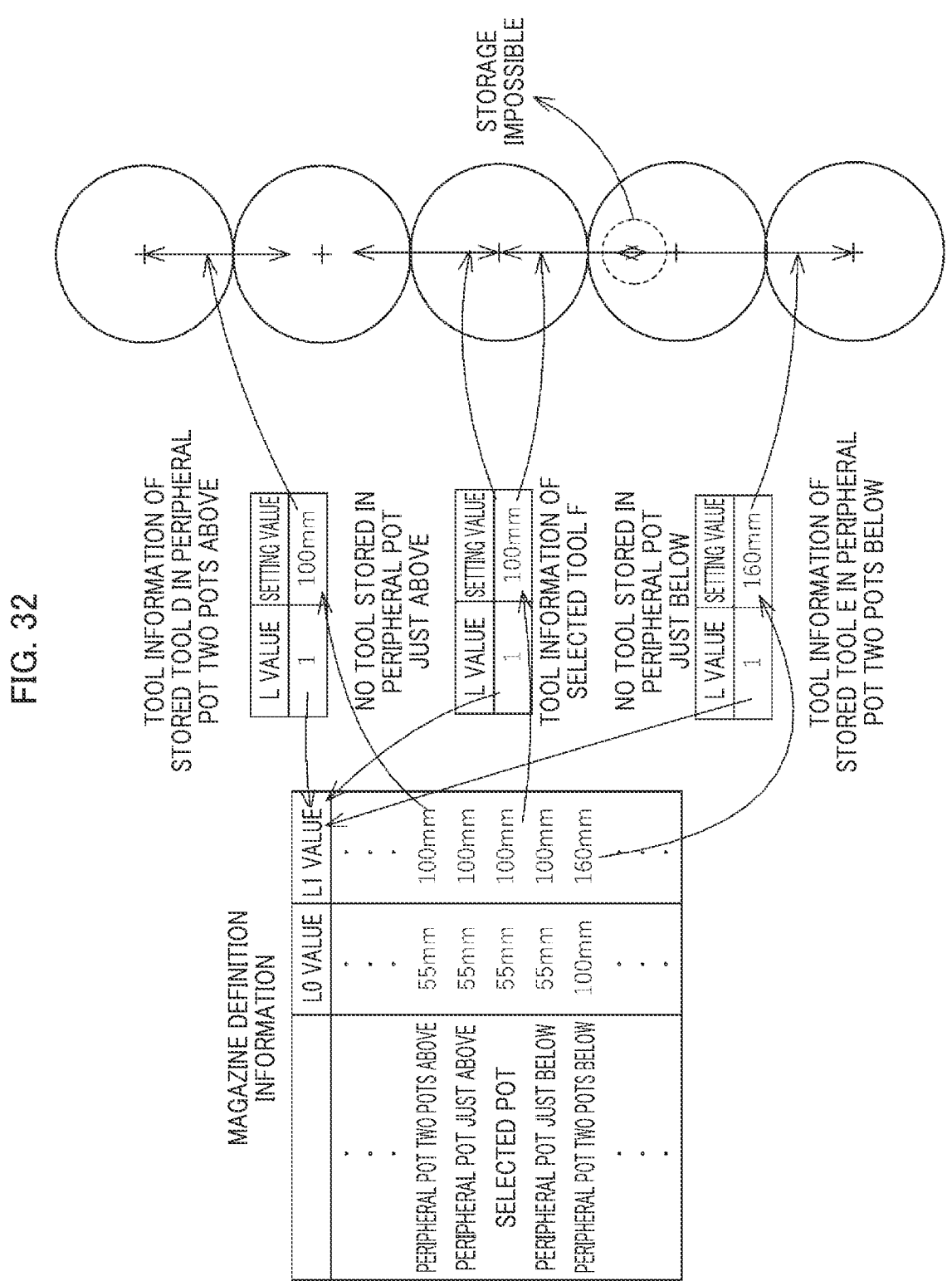
FIG. 32 is a diagram illustrating an outline of an example 3 of the second modification.

FIG. 32 is a diagram illustrating an outline of an example 3 of the second modification.

The magazine definition information and the storage status of tools are the same as those in the example 2. The example 3 is different from the example 2 only in that the type of the L value of the selected tool F is "1". This situation occurs, for example, when the user selects a larger type of the L value. When the maximum diameter of the tool F is 100 mm (the maximum radius thereof is 50 mm), "0" is usually selected as the type of the L value. However, when the user intends to observe the tool F in a stored state, a larger type "1" of the L value is sometimes selected to provide a space on the sides of the tool to improve visualization. Furthermore, selection of a larger type "1" of the L value is also assumed when a larger type of the L value is to be set to prevent interference by all possible means in the case of a tool that is valuable or expensive and that should not be hit under any circumstances.

The tool information of the stored tool D and the tool information of the stored tool E are the same as those in the case illustrated in FIG. 31. When the type of the L value in the tool information of the selected tool F is "1", the setting value: 100 mm of the L1 value of a selected pot is acquired. In the determination of S116 in FIG. 29, it is determined that the areas of the selected tool F and the stored tool D do not overlap with each other because the sum: 200 mm of the setting value: 100 mm of the stored tool D and the setting value: 100 mm of the selected tool F is shorter than the pitch×2: 240 mm. On the other hand, in the determination of S126 in FIG. 29, it is determined that the areas of the selected tool F and the stored tool E overlap with each other (S126: Y in FIG. 29) because the sum: 260 mm of the setting value: 160 mm of the stored tool E and the setting value: 100 mm of the selected tool F is above the pitch×2: 240 mm. Therefore, it is determined in S128 in FIG. 29 that the storage is impossible and informing is performed.

Example 4 of Second Modification

Figure 33:
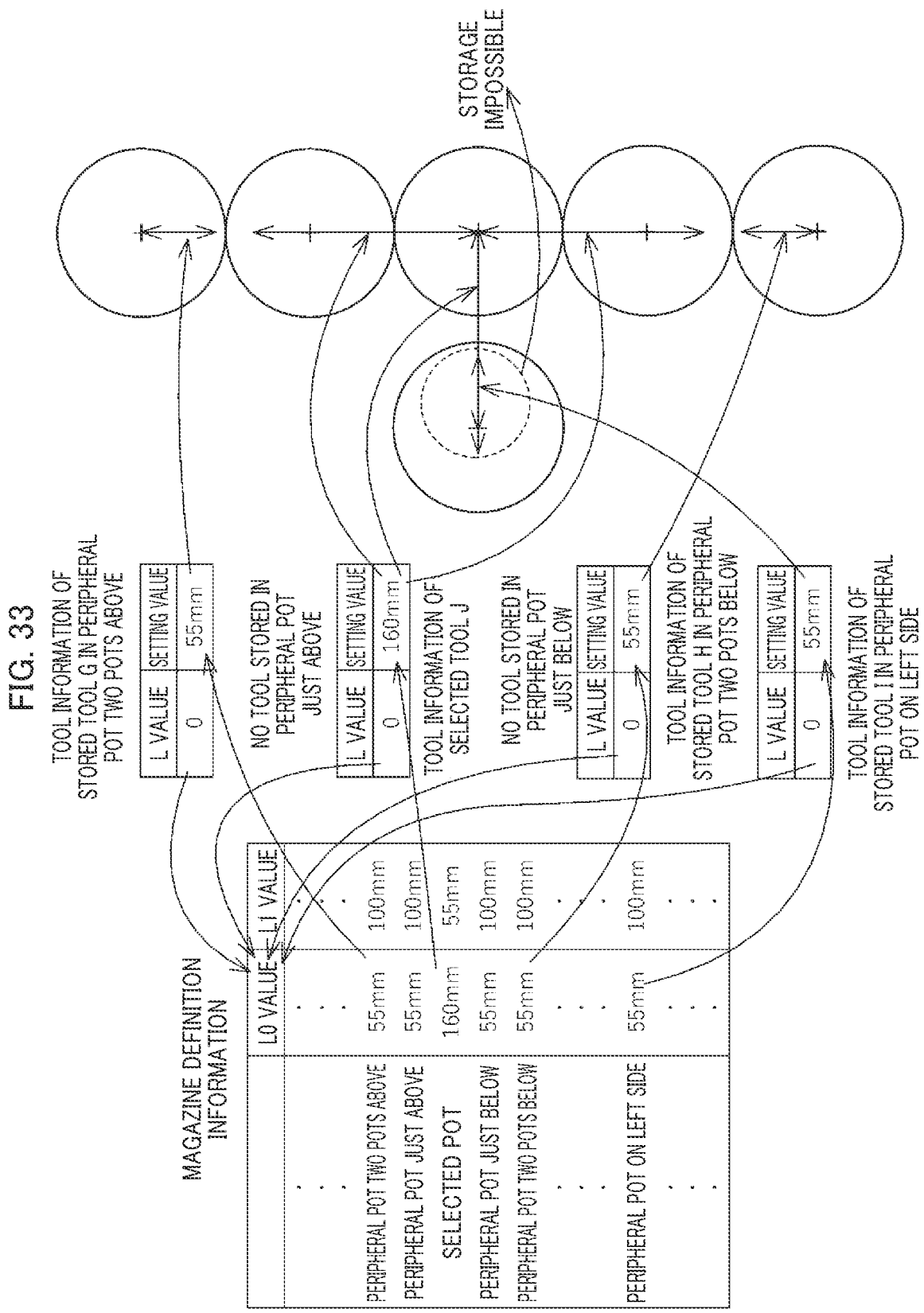
FIG. 33 is a diagram illustrating an outline of an example 4 of the second modification.

FIG. 33 is a diagram illustrating an outline of an example 4 of the second modification.

The above explanations presuppose that, even in the case of a tool having a large size as illustrated in FIG. 20, the tool has a short lateral width, there is margin in the intervals between pots in the lateral direction, and no interference occurs with tools stored in pots next thereto in the lateral direction. In the example 4, a case in which the lateral width of a tool is long, such as a case in which the profile seen from the front is a true circle is also supposed. Therefore, pots such as a pot on the left side of the selected pot and a pot on the right side thereof are also targets of the determination of the tool interference.

When interference with pots on the left side and pots on the right side is also to be determined, processes (not illustrated) relating to the pots on the left side are performed without determining that the storage is possible in the process of S130 illustrated in FIG. 29. When there is no pot on the left side or no tool is stored in peripheral pots on the left side, the processes proceed to processes (not illustrated) relating to the pots on the right side. The processes relating to the pots on the left side and the processes relating to the pots on the right side are basically the same as the processes relating to the pots on the upper side and the processes relating to the pots on the lower side, except that the relative positions of the peripheral pots are different.

When a tool is stored in a peripheral pot on the left side, the same processes as those of S116 and S126 are performed. That is, the determining unit 546 determines whether the area of the stored tool in the peripheral pot on the left side and the area of a selected tool overlap with each other. The determining unit 546 determines that the area of the stored tool on the left side and the area of the selected tool overlap with each other when the sum of the setting value of the selected tool and the setting value of the stored tool in the peripheral pot on the left side is equal to or more than the distance between the centers of the candidate pot and the peripheral pot on the left side. Conversely, when the sum of the setting value of the selected tool and the setting value of the stored tool in the peripheral pot on the left side is less than the distance between the centers of the candidate pot and the peripheral pot on the left side, the determining unit 546 determines that the area of the stored tool on the left side and the area of the selected tool do not overlap with each other. When the area of the stored tool on the left side and the area of the selected tool overlap with each other, the determining unit 546 determines that the storage is impossible and causes the processes to proceed to the process of S38, and the informing unit 532 informs that the storage is impossible in S44. When the area of the stored tool on the left side and the area of the selected tool do not overlap with each other, the processes proceed to the processes relating to the pots on the right side.

In the processes relating the pots on the right side, the determining unit 546 performs, for the pots on the right side, the same processes as those in the case of the pots on the left side. When there is no pot on the right side, when no tool is stored in peripheral pots on the right side, or when the area of the selected tool and the area of the stored tool on the right side do not overlap with each other, the determining unit 546 determines that the selected tool can be stored in the candidate pot and causes the processes to proceed to the process of S38, and the tool storage operation indicated in S40 is performed. When the area of the selected tool and the area of the stored tool on the right side overlap with each other, the determining unit 546 determines that the storage is impossible and causes the processes to proceed to the process of S38, and the informing unit 532 informs that the storage is impossible in S44.

FIG. 33 assumes that a tool G is stored in a peripheral pot two pots above, a tool H is stored in a peripheral pot two pots below, and a tool I is stored in a peripheral pot on the left side. It is also assumed that there is no pot on the right side. As for the stored tool G in the pot two pots above and the stored tool H in the pot two pots below, the area of the selected tool and the area of the stored tool do not overlap with each other as illustrated in FIG. 33.

When the type of the L value of the tool information of the stored tool I on the left side is "0", the setting value: 55 mm of the L0 value of the peripheral pot on the left side is acquired. When the type of the L value of the tool information of a selected tool J is "0", the setting value: 160 mm of the L0 value of the selected pot is acquired. Since the processes relating to the pots on the upper side and the processes relating to the pots on the lower side are the same as those in the examples described above, explanations thereof are omitted.

In the processes relating to the pots on the left side, the determining unit 546 determines that the areas of the selected tool J and the stored tool I on the left side overlap with each other because the sum: 215 mm of the setting value: 55 mm of the stored tool I on the left side and the setting value: 160 mm of the selected tool J is above the distance: 140 mm between the center of the candidate pot and the center of the peripheral pot on the left side. It is then determined that storage of the selected tool J in the selected pot is impossible and informing is performed.

While an example in which the determination of tool interference on the pots on the left side and the pots on the right side is performed has been described, the determination of tool interference may be performed also on other surrounding pots, such as an upper-left pot, a lower-left pot, an upper-right pot, and a lower-right pot. Furthermore, the determination of tool interference may be performed on pots included in a wider range, such as a pot two pots away on the right and a pot two pots away on the left.

Other Modifications

While an example of the rack magazine has been described in the embodiment, the embodiment may be applied to other magazines. For example, the embodiment may be applied to a chain magazine.

In the determining processes indicated in S66 and S76, overlapping of tool ranges may be determined by other methods than that in the embodiment. For example, tools having the maximum diameter equal to or smaller than 70 centimeters (cm) are classified into "small tools" and tools having the maximum diameter larger than 70 cm are classified into "large tools", and it may be determined that the tool ranges overlap with other when a large tool and a large tool are next to each other. It may be determined that the tool ranges do not overlap with each other when a large tool and a small tool are next to each other and when a small tool and a small tool are next to each other.

In association with the process of S56 illustrated in FIG. 11, the upper limits as the machinery limitation may be used instead of the upper limits as the operation rule. Alternatively, the upper limits as the operation rule are used when the upper limits as the operation rule are set, and the upper limits as the machinery limitation may be used when the upper limits as the operation rule are not set.

While an example in which the use prohibition flag is included in the pot use status (FIG. 6) has been described in the embodiment, the use prohibition flag may be included in the magazine definition information (FIG. 4).

The present invention is not limited to the above described embodiment or the modifications thereof, and may be embodied while modifying the components without departing from the scope of the invention. Various inventions may be formed by appropriately combining plural components disclosed in the above described embodiment and the modifications thereof. Further, several components may be omitted from the entire components described in the above described embodiment and the modifications thereof.

What is claimed is:

1. An information processing system for a machine tool comprising:

a processor including a request accepting unit, a selecting unit, a determining unit, and an informing unit; and a storage device including a magazine-definition-information storing unit, a tool information storing unit, and a pot-use-status storing unit, wherein the request accepting unit accepts a selected pot request for selecting a pot to store a tool selected to be stored in a pot of a machine tool magazine;

the magazine-definition-information storing unit includes a plurality of cells including a first cell, a second cell, and a third cell, in each of which a length from a predetermined position of each of a first pot and a second pot can be set according to a structure of the machine tool magazine, the magazine-definition-information storing unit stores a setting value in each of the first cell, the second cell, and the third cell of the selected pot;

the tool information storing unit stores tool information for a plurality of tools including identification information of a cell applicable to each of the tools;

the pot-use-status storing unit stores information of a tool stored in each of the pots;

the selecting unit, in accordance with the identification information of the cell applicable to the selected tool, selects one of the cells when the selected pot is the first pot, and in accordance with the identification information of the cell applicable to a tool stored in an adjacent pot near the selected pot, selects one of the cells when the adjacent pot is the second pot;

the determining unit determines whether a storage condition to store the selected tool in the selected pot is met by comparing a sum of the setting value of the one cell selected for the selected pot and the setting value of the one cell selected for the adjacent pot with a distance between the predetermined position of the adjacent pot and the predetermined position of the selected pot; and the informing unit informs when the condition to store the selected tool in the selected pot is not met, wherein the magazine-definition-information storing unit stores a first setting value, a second setting value, and a third setting value indicating lengths from the predetermined position of each pot respectively in the first cell, the second cell, and the third cell for each of the pots.

2. The information processing system according to claim 1, wherein the storage device includes a storage condition storing unit that stores storage conditions including a plurality of subconditions each associating: an AND condition of four items including a type of the selected tool, a position of a peripheral pot near the selected pot, whether a tool is stored in the peripheral pot, and a type of the stored tool in the peripheral pot; an identifier of a next subcondition to be evaluated or an indication of termination; and a determination result of whether storage in the selected pot is possible, and the determining unit identifies the type of the selected tool based on identification information of the cell applicable to the selected tool, identifies the type of the stored tool based on identification information of the cell applicable to the stored tool, evaluates the AND condition of the subcondition, and when the AND condition is not satisfied, proceeds to a next subcondition in a predetermined order and repeats the evaluation, and when the AND condition is satisfied and the identifier of the next subcondition is set in the subcondition, proceeds to the next subcondition specified by the identifier and repeats the evaluation, and when the AND condition is satisfied and the indication of termination is set in the subcondition, and determines the determination result of whether the storage in the selected pot is possible based on subcondition.

3. The information processing system according to claim 1, wherein a same setting value is set in the second cell of the first pot and the second cell of the second pot, and different setting values are set in the third cell of the first pot and the third cell of the second pot, respectively.

4. A machine tool comprising:

(a) a magazine for accommodating a plurality of tools;

(b) a tool rest including a plurality of stations to which the plurality of tools are attached; and (c) an information processing unit including a processor and a storage device, wherein the processor includes a request accepting unit, a selecting unit, a determining unit, and an informing unit; and the storage device includes a magazine-definition-information storing unit, a tool information storing unit, and a pot-use-status storing unit, wherein the request accepting unit accepts a selected pot request for selecting a pot to store a tool selected to be stored in a pot of the machine tool magazine;

the magazine-definition-information storing unit includes a plurality of cells including a first cell, a second cell, and a third cell in each of which a length from a predetermined position of each of a first pot and a second pot can be set according to a structure of the machine tool magazine, the magazine-definition-information storing unit stores a setting value in each of the first cell, the second cell, and the third cell of the selected pot;

the tool information storing unit stores tool information for a plurality of tools including identification information of a cell applicable to each of the tools;

the pot-use-status storing unit stores information of a tool stored in each of the pots;

the selecting unit, in accordance with the identification information of the cell applicable to the selected tool, selects one of the cells when the selected pot is the first pot, and in accordance with the identification information of the cell applicable to a tool stored in an adjacent pot near the selected pot, selects one of the cells when the adjacent pot is the second pot;

the determining unit determines whether a storage condition to store the selected tool in the selected pot is met by comparing a sum of the setting value of the one cell selected for the selected pot and the setting value of the one cell selected for the adjacent pot with a distance between the predetermined position of the adjacent pot and the predetermined position of the selected pot; and the informing unit informs when the condition to store the selected tool in the selected pot is not met, wherein the magazine-definition-information storing unit stores a first setting value, a second setting value, and a third setting value indicating lengths from the predetermined position of each pot respectively in the first cell, the second cell, and the third cell for each of the pots.

* * * * *